(12) United States Patent
Takai et al.

(10) Patent No.: US 11,623,598 B2
(45) Date of Patent: Apr. 11, 2023

(54) AIRBAG COVER

(71) Applicant: TOYODA GOSEI CO., LTD., Kiyosu (JP)

(72) Inventors: Hiroki Takai, Kiyosu (JP); Atsushi Kobayashi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/884,095

(22) Filed: Aug. 9, 2022

(65) Prior Publication Data

US 2023/0071729 A1    Mar. 9, 2023

(30) Foreign Application Priority Data

Aug. 24, 2021  (JP) .............................. JP2021-136685
Nov. 16, 2021  (JP) .............................. JP2021-186604

(51) Int. Cl.
*B60R 21/2165* (2011.01)
*B60R 21/215* (2011.01)

(52) U.S. Cl.
CPC ...................... *B60R 21/2165* (2013.01); *B60R 2021/21537* (2013.01)

(58) Field of Classification Search
CPC ...................... B60R 2021/21537; B60R 21/215
See application file for complete search history.

(56) References Cited

U.S. PATENT DOCUMENTS 5,641,177 A * 6/1997 Berg ................... B60R 21/2165
                                                              280/732

FOREIGN PATENT DOCUMENTS

| CN | 101585350 A | * | 11/2009 | ......... B60R 21/2165 |
|---|---|---|---|---|
| DE | 102007008797 A1 | * | 8/2008 | .......... B60R 21/215 |
| JP | H10-264759 A | | 10/1998 | |
| JP | 3137027 B2 | * | 2/2001 | .......... B60R 21/216 |
| JP | 2004175248 A | * | 6/2004 | |
| JP | 2006137344 A | * | 6/2006 | ............. B32B 27/08 |
| JP | 2008-068791 A | | 3/2008 | |
| JP | 2009006912 A | * | 1/2009 | |
| JP | 2009-248610 A | | 10/2009 | |
| JP | 4906551 B2 | * | 3/2012 | |
| JP | 2012153237 A | * | 8/2012 | |
| JP | 5598348 B2 | * | 10/2014 | |
| WO | WO-2007096147 A1 | * | 8/2007 | .......... B60R 21/215 |
| WO | WO-2013029240 A1 | * | 3/2013 | .......... B60R 21/215 |
| WO | WO-2018116659 A1 | * | 6/2018 | .......... B60H 1/2225 |

* cited by examiner

*Primary Examiner* — Nicole T Verley
(74) *Attorney, Agent, or Firm* — Posz Law Group, PLC

(57) ABSTRACT

An airbag cover includes a base material, a retainer, an airbag cover main body, and a flexible skin layer. The door portion includes a door constituent portion of the base material, and a door support portion provided in the retainer and holding the door constituent portion. The retainer includes the door support portion, a peripheral edge portion disposed around the door support portion, and a substantially flat plate-shaped hinge portion disposed between the peripheral edge portion and the door support portion and bendable when the door portion is opened. The base material is provided with a space portion at a disposition portion of the hinge portion of the retainer, and the hinge portion is a non-disposition portion of the base material. A region of the hinge portion includes two layers of the hinge portion of the retainer and the skin layer bonded to the hinge portion.

6 Claims, 16 Drawing Sheets

VIII-VIII CROSS-SECTIONAL VIEW

AIRBAG COVER

CROSS-REFERENCE TO RELATED APPLICATIONS

This application is based on and claims priority under 35 USC 119 from Japanese Patent Application No. 2021-136685 filed on Aug. 24, 2021 and Japanese Patent Application No. 2021-186604 filed on Nov. 16, 2021.

TECHNICAL FIELD

The present disclosure relates to an airbag cover configured to be used in an airbag device including an airbag which inflates to protect an occupant or the like, configured to cover a folded airbag, and configured to form a protruding opening to protrude the airbag when the airbag is inflated.

BACKGROUND ART

In the related art, an airbag cover disposed in an instrument panel of a vehicle includes: a door portion opened by being pushed by an airbag to form a protruding opening of the airbag when the airbag is inflated; a base material disposed in an area including the door portion and made of a synthetic resin such as polypropylene; and a retainer disposed in a disposition area of the door portion and made of a synthetic resin such as an olefin-based thermoplastic elastomer softer than the base material, and is configured to be integrally molded by two-color molding using molding materials of the base material and the retainer (for example, see JP-A-2009-248610). In the airbag cover, the door portion includes a door constituent portion of the base material and a door support portion provided in the retainer and holding the door constituent portion. The retainer includes a door support portion, a peripheral edge portion disposed around the door support portion, and a hinge portion disposed between the peripheral edge portion and the door support portion and bending when the door portion is opened. Different from a configuration in the related art where a base material and a retainer are separately formed and are subjected to vibration welding, the airbag cover is formed into a two-color molded product, and the hinge portion of the retainer is not curved to be bulky, but is formed into a substantially flat plate-shaped configuration which ensures bendable flexibility. The hinge portion has a thin and substantially flat plate shape, and is coupled to a back surface side of the base material.

However, in the airbag cover illustrated in JP-A-2009-248610, although the hinge portion of the retainer ensures flexibility as a thin wall, the hinge portion is coupled to a portion in the base material corresponding to the hinge portion by the two-color molding, and the portion of the base material is also bent at the time of opening the door portion, and thus there is room for improvement in terms of further improving opening performance of the door portion.

SUMMARY

The present disclosure has been made to solve the above-described problem, and an object thereof is to provide an airbag cover capable of improving opening performance of a door portion.

According to an aspect of the present disclosure, there is provided an airbag cover which includes a door portion configured to be pushed and opened by an airbag to form a protruding opening of the airbag when the airbag is inflated, the airbag cover including:
  a base material made of a synthetic resin and disposed in an area including the door portion;
  a retainer made of a synthetic resin softer than the base material and coupled to a back surface side of the base material in a disposition area of the door portion;
  an airbag cover main body including the base material and the retainer; and
  a flexible skin layer bonded to a front surface side of the airbag cover main body and breakable when the door portion is opened, in which:
  the door portion includes:
    a door constituent portion of the base material; and
    a door support portion provided in the retainer and holding the door constituent portion;
  the retainer includes:
    the door support portion;
    a peripheral edge portion disposed around the door support portion; and
    a hinge portion being substantially flat plate-shaped, disposed between the peripheral edge portion, and the door support portion and bendable when the door portion is opened;
  the base material is provided with a space portion at a disposition portion of the hinge portion of the retainer, and the hinge portion is a non-disposition portion of the base material; and
  a region of the hinge portion includes two layers of the hinge portion of the retainer and the skin layer bonded to the hinge portion.

In the airbag cover according to the embodiment, a hinge part when the door portion is opened includes, as a non-disposition portion of the base material provided with the space portion, two layers of the skin layer having flexibility and the hinge portion of the retainer made of a synthetic resin softer than the base material, in which the base material is not disposed. Therefore, when the door portion is opened, the base material itself is not bent, so that the hinge part is smoothly bent and the door portion is opened. Further, the surface of the airbag cover main body including the base material and the retainer includes the hinge part and is provided with the skin layer, and the base material including the space portion is not exposed to the surface side, so that design of the airbag cover is improved.

Therefore, in the airbag cover according to the embodiment, opening performance of the door portion can be improved, and the design can be improved.

In the airbag cover according to the embodiment, it is desirable that the door portion includes three layers of the skin layer, the door constituent portion of the base material, and the door support portion of the retainer disposed from an outer surface side.

In such a configuration, the door portion is configured such that the base material is disposed on a back surface side of the skin layer on the front surface side similarly to the area of the general portion excluding the door disposition area of the door portion in the airbag cover, that is, the area of the general portion in which the retainer is not provided, and the skin layer of the door portion is supported by the base material on the back surface side, so that tactile sensation of the door portion can be made equivalent to tactile sensation of the general portion.

Further, in the airbag cover according to the present disclosure, a breakable portion which is broken by being pushed by the inflating airbag is disposed around the door portion except for the disposition portion of the hinge portion, and the breakable portion includes, as a non-disposition portion of the retainer, two layers of the skin layer and the base material provided with a weak portion.

In such a configuration, since the breakable portion to be broken when the door portion is opened is configured without disposing the portion of the retainer, the breakable portion which is opened by being pushed by the inflating airbag includes only two layers, that is, the breakable skin layer and the base material which is easily broken and provided with the weak portion, the breakable portion is smoothly broken when the door portion is opened, and the opening performance of the door portion can be stabilized.

Further, in the airbag cover according to the present disclosure, the retainer is configured such that the peripheral edge portion is provided with a coupling wall portion which is coupled to an attachment base of an airbag device holding the folded airbag.

In such a configuration, since the disposition area of the door portion of the airbag cover is coupled to the attachment base holding the folded airbag in the airbag device via the coupling wall portion extending from the peripheral edge portion of the retainer, and when the airbag is inflated, the peripheral edge portion of the retainer is coupled to the attachment base of the airbag device and does not move away from an attachment base side, the door portion configured to be coupled to the peripheral edge portion in the retainer via the hinge portion can be quickly opened by appropriately receiving a pressing force of the inflating airbag.

Further, in the airbag cover according to the present disclosure, a portion formed of the three layers of the skin layer, the base material, and the retainer is disposed in an outer area of the hinge portion in the disposition area of the door portion.

In such a configuration, even if the hinge portion of the retainer is not coupled to the base material in the airbag cover main body, the peripheral edge portion of the retainer is coupled to the base material, and even if a strong tensile force is applied to the hinge portion of the retainer when the door portion is opened, the portion of the peripheral edge portion in the vicinity of the hinge portion of the retainer is coupled to the base material to prevent peel-off from the base material. Thus, the door portion can smoothly open the hinge part (the hinge portion of the retainer) while bending the hinge part without affecting the skin layer or the like in the area of the general portion where the retainer is not provided in the airbag cover.

In the airbag cover according to the present disclosure, it is desirable that the airbag cover main body is integrally molded by two-color molding using molding materials of the base material and the retainer.

In such a configuration, the base material and the retainer are separately formed, compared with a case where the airbag cover main body is formed by bonding the base material and the retainer by vibration welding or the like, or by insert-molding, a mold cost and man-hours are reduced, and the airbag cover main body can be efficiently formed, which can contribute to reduction of the man-hours and the cost of manufacturing the airbag cover.

DESCRIPTION OF EMBODIMENTS

Figure 1:
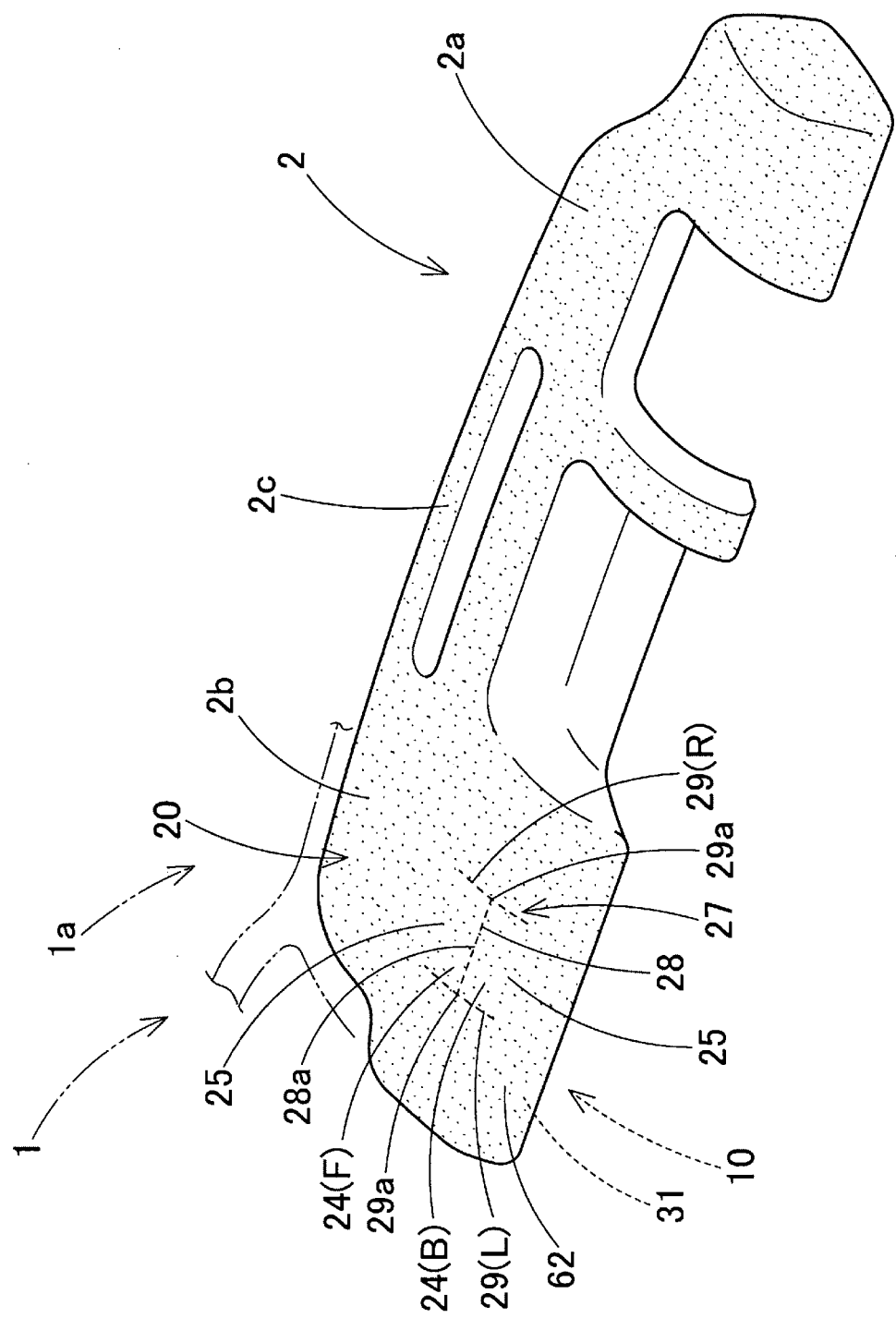
FIG. 1 is a schematic perspective view of an airbag device using an airbag cover according to an embodiment of the present disclosure.

An embodiment of the present disclosure will be described with reference to the drawings. As illustrated in FIGS. 1 to 4, an airbag cover 20 according to the embodiment is disposed in an instrument panel 2 of a vehicle 1 and used in an airbag device 10 for a front passenger seat. The instrument panel 2 is disposed below a front windshield 1a on a front side of a front seat of the vehicle 1, and includes a driver seat side portion 2a on a front side of a driver seat, a front passenger seat side portion 2b in front of the front passenger seat, and a central portion 2c on a front side of a center console (not illustrated). A portion of the front passenger seat side portion 2b is formed as a portion of the airbag cover 20 which forms a protruding opening 68 having a substantially rectangular opening such that an airbag 11 smoothly protrudes when the airbag 11 (see FIG. 2) is inflated.

Figure 2:
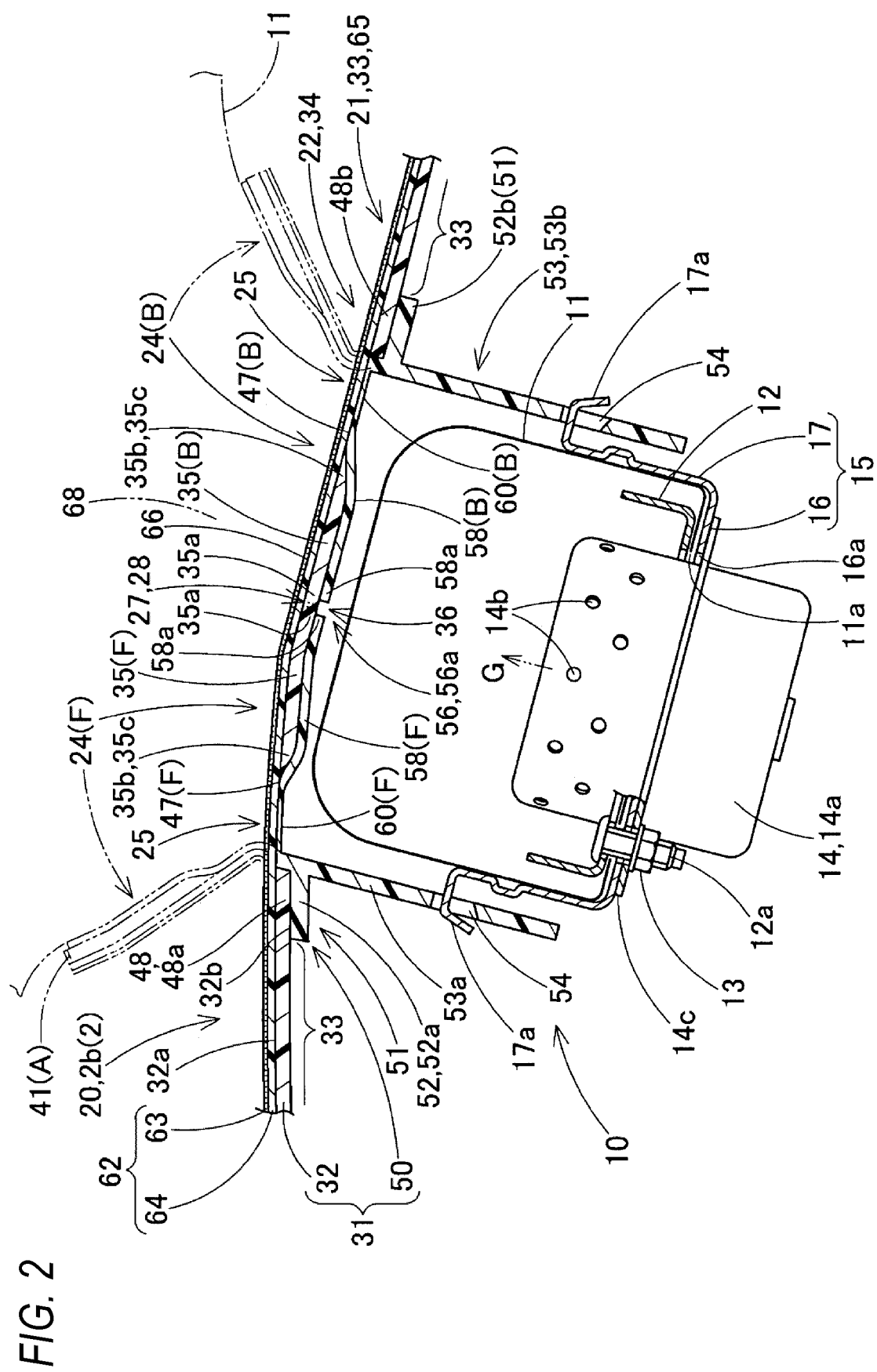
FIG. 2 is a schematic longitudinal cross-sectional view of the airbag device according to the embodiment taken along a front-rear direction.
Figure 4:
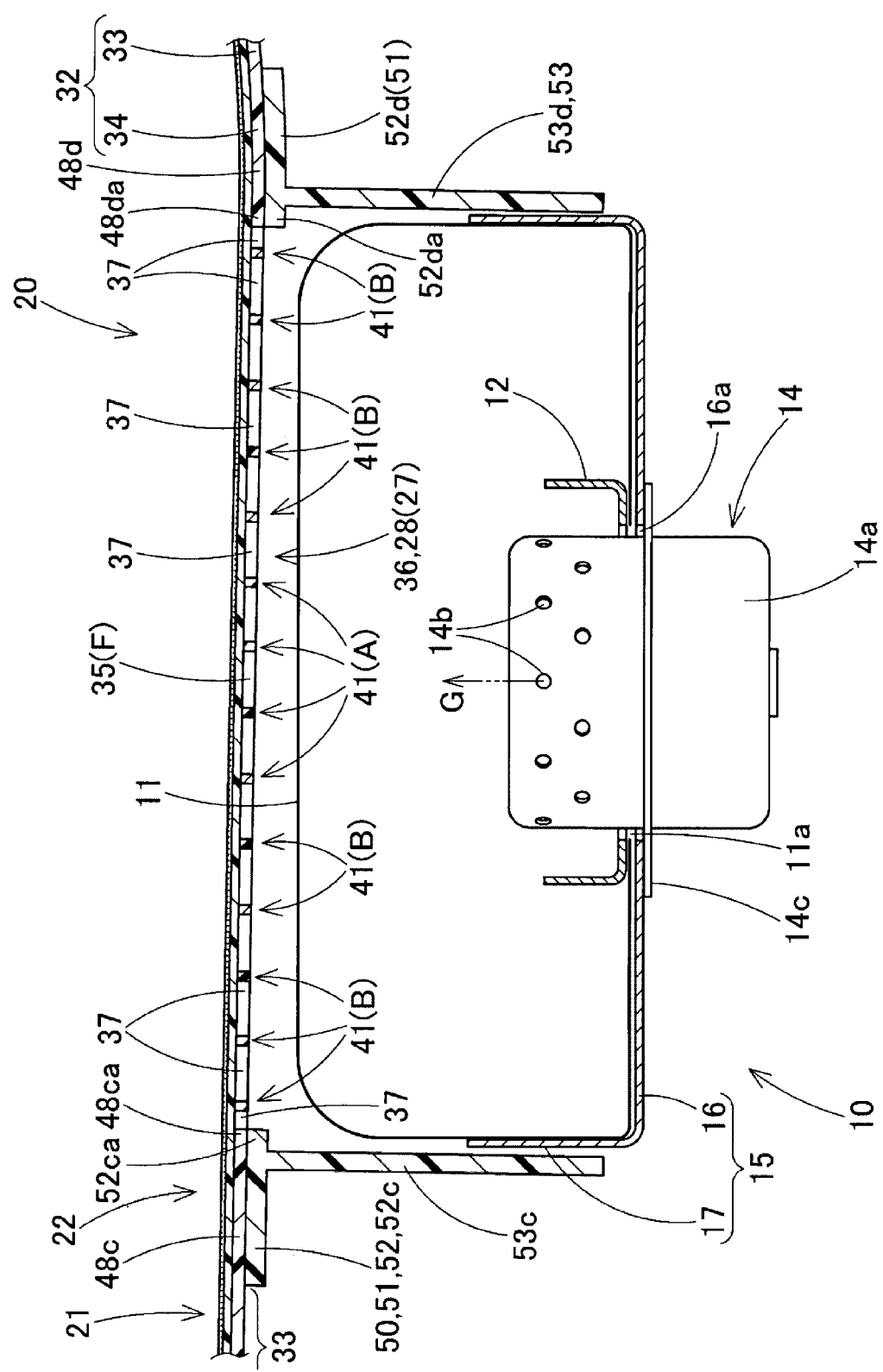
FIG. 4 is a schematic longitudinal cross-sectional view of the airbag device according to the embodiment taken along a left-right direction.

As illustrated in FIGS. 2 and 4, the airbag device 10 includes the airbag 11 which is inflated such that an inflation gas G is caused to flow into the airbag 11 to protect a passenger on a front passenger seat, an inflator 14 which supplies the inflation gas G to the airbag 11, the airbag cover 20 which covers the folded and accommodated airbag 11, an attachment base 15 which accommodates and holds the folded airbag 11 and the inflator 14. The attachment base 15 is coupled to a body side of the vehicle 1 by a bracket (not illustrated). The vicinity of an outer peripheral edge or the like of the instrument panel 2 including the airbag cover 20 is held on the body side of the vehicle 1, and the instrument panel 2 is coupled to the attachment base 15 at a portion of the airbag cover 20 by using a coupling wall portion 53 described later.

The airbag 11 is formed of a woven fabric of polyester or the like, and an inflation completed shape of the airbag 11 is a substantially truncated quadrangular pyramid shape tapered toward a front portion side, in which a receiving surface for receiving the passenger on the front passenger seat is provided at a rear end. The airbag 11 includes an inflow opening 11a, on a lower surface of a front side, through which the inflation gas G flows into the airbag 11. The inflow opening 11a is opened in a circular shape. A peripheral edge of the inflow opening 11a is pressed by a substantially quadrangular annular retainer 12 disposed in the airbag 11 and attached to a bottom wall portion 16 of the attachment base 15. The retainer 12 has bolts 12a which extend downward and protrude at four corners having a substantially quadrangular annular shape. Each of the bolts 12a penetrates the peripheral edge of the inflow opening 11a of the airbag 11, the bottom wall portion 16 (to be described later) of the attachment base 15, and a flange portion 14c (to be described later) of the inflator 14. Each of the bolts 12a attaches and fixes the airbag 11 and the inflator 14 to the bottom wall portion 16 of the attachment base 15 by fastening a nut 13.

The inflator 14 includes a main body portion 14a having a substantially cylindrical shape and provided with gas discharge ports 14b discharging the inflation gas G on an upper portion thereof, and the flange portion 14c protruding from an outer peripheral surface of the main body portion 14a and allowing each bolt 12a of the retainer 12 to penetrate therethrough.

The attachment base 15 is made of sheet metal and includes the bottom wall portion 16 having a substantially rectangular plate shape and a side wall portion 17 having a substantially quadrangular tubular shape and extending upward from an outer peripheral edge of the bottom wall portion 16. An insertion hole 16a into which the main body portion 14a of the inflator 14 is inserted from below is opened in the bottom wall portion 16. A through hole (not illustrated) through which each bolt 12a of the retainer 12 penetrates is disposed at a peripheral edge of the insertion hole 16a. The peripheral edge of the inflow opening 11a of the airbag 11 and the flange portion 14c of the inflator 14 are attached and fixed to the bottom wall portion 16 of the attachment base 15 by the bolts 12a of the retainer 12 and the nuts 13. Locking hooks 17a locked to locking holes 54 provided in the coupling wall portion 53 of the retainer 50 are formed in the side wall portion 17. The locking hooks 17a are disposed at front and rear portions of the side wall portion 17, and the plurality of locking hooks 17a are disposed side by side along a left-right direction.

As illustrated in FIGS. 1 to 6, the airbag cover 20 includes door portions 24 (F, B) which are pushed and opened by the airbag 11 to form the protruding opening 68 of the airbag 11 when the airbag 11 is inflated. The door portions 24 (F, B) are configured to open to form the protruding opening 68, and the protruding opening 68 has a substantially rectangular shape which is similar to the shape of the bottom wall portion 16 in the attachment base 15 of the airbag device 10. The door portions 24F, 24B of the embodiment are configured to open like double doors on both front and rear sides, and are configured to allow the protruding opening 68 to be opened in a region divided into two at front and rear sides when the door portions 24F, 24B are opened.

The airbag cover 20 includes a door disposition area 22 where the door portions 24 (F, B) are disposed, and a general portion 21 around the door disposition area 22. The door disposition area 22 includes the door portions 24F, 24B themselves, a hinge part 25 thereof, the breakable portion 27 for breaking peripheral edges of the door portions 24F, 24B for opening the door portions 24F, 24B, and a region of a peripheral edge portion 51 (to be described later) of the retainer 50. The breakable portion 27 is disposed at the peripheral edges of the door portions 24F, 24B which open to both front and rear sides, and is disposed in a substantially H shape when viewed from above, in which a horizontal line portion 28 which extends in the left-right direction in a boundary portion between the front and rear door portions 24F, 24B and vertical line portions 29 (L, R) which extend to both front and rear sides on both left and right sides of the horizontal line portion 28 are disposed.

Further, the airbag cover 20 has a structure including an airbag cover main body 31 and a skin layer 62 bonded to a front surface side of the airbag cover main body 31.

The airbag cover main body 31 includes a base material 32 made of a synthetic resin such as polypropylene and disposed in the area including the door portions 24 (F, B), and the retainer 50 made of a synthetic resin such as an olefin-based thermoplastic elastomer which is softer than the base material 32 and disposed to be coupled to a back surface 32b side of the base material 32 in the door disposition area 22 of the door portions 24 (F, B). In the case of the embodiment, the airbag cover main body 31 is formed as a two-color molded product integrally molded by two-color molding using molding materials of the base material 32 and the retainer 50.

The base material 32 and the skin layer 62 of the airbag cover main body 31 extend not only to the front passenger seat side portion 2b, which is an area of the airbag cover 20 of the instrument panel 2, but also to the driver seat side portion 2a and the central portion 2c. That is, a general portion 21 of the airbag cover 20 includes the base material 32 of the airbag cover main body 31 and the skin layer 62, and is disposed to extend to a driver seat side portion 2a side and a central portion 2c side of the instrument panel 2.

The door portions 24F, 24B of the airbag cover 20 include door constituent portions 35F, 35B of the base material 32, and door support portions 58F, 58B which are provided in the retainer 50 and coupled to the door constituent portions 35F, 35B to hold the respective door constituent portions 35F, 35B from a back surface side, and a door skin portion 66 of the skin layer 62 is bonded and disposed on a front surface side of each of the door constituent portions 35F, 35B.

The skin layer 62 includes a fabric 63 as a skin disposed on a front surface 62a side, and a sheet-shaped cushion layer 64 to which the fabric 63 is bonded. The fabric 63 is a woven fabric obtained by weaving yarns of polyester or the like as warps and wefts. The cushion layer 64 is formed of a cushion material made of polypropylene or the like. The skin layer 62 includes a door skin portion 66 disposed on the front surface side of each of the door portions 24F, 24B, and a general portion 65 around the door skin portion 66. A boundary portion between a peripheral edge of the door skin portion 66 and the general portion 65 is disposed at a portion of the breakable portion 27, and is broken when the door portions 24 (F, B) are opened.

The retainer 50 includes the above-described door support portions 58 (F, B), a peripheral edge portion 51 disposed around the door support portions 58 (F, B), and thin and substantially flat plate-shaped hinge portions 60 (F, B) which are disposed between the peripheral edge portion 51 and the door support portions 58 (F, B) to couple the peripheral edge portion 51 and base portions 58b of respective door support portions 58 (F, B) and can be bent when the door portions 24 (F, B) are opened. In the retainer 50, a gap 56 corresponding to the breakable portion 27 is provided between peripheral edges of the door support portion 58F and the hinge portion 60F, peripheral edges of the door support portion 58B and the hinge portion 60B, and an inner peripheral side of the peripheral edge portion 51. That is, when viewed from above, the gap 56 has a substantially H shape including a horizontal bar portion 56a corresponding to the horizontal line portion 28 of the breakable portion 27 and vertical bar portions 56b (L, R) corresponding to the left and right vertical line portions 29 (L, R) of the breakable portion 27 (see FIG. 6).

In the case of the embodiment, the base material 32 is provided with space portions 47 (F, B) at disposition portions of the hinge portions 60 (F, B) of the retainer 50, and the portions of the hinge portions 60 (F, B) are non-disposition portions where the base material 32 is not disposed. Therefore, in the airbag cover 20, the hinge part 25 of the door portions 24 (F, B) is a region of the hinge portions 60 (F, B) of the retainer 50, and includes two layers of the hinge portions 60 (F, B) of the retainer 50 and the skin layer 62 bonded to the hinge portions 60 (F, B).

The peripheral edge portion 51 of the retainer 50 includes a flange portion 52 extending outward from an upper end of the coupling wall portion 53 having a rectangular tubular shape extending downward, as a substantially rectangular annular shape disposed at a peripheral edge of the protruding opening 68. The flange portion 52 includes a front flange portion 52a, a rear flange portion 52b, a left flange portion 52c, and a right flange portion 52d which are disposed on the front, rear, left, and right of the coupling wall portion 53, respectively. The peripheral edge portion 51 further includes inner protruding portions 52ca, 52da which extend to inner sides of left and right wall portions 53c, 53d (to be described later) of the coupling wall portion 53.

Locking holes 54 into which the locking hooks 17a of the attachment base 15 of the airbag device 10 are inserted are formed in the front wall portion 53a and the rear wall portion 53b at the front and rear of the coupling wall portion 53 of the retainer 50 (see FIG. 2).

The base material 32 includes a door disposition area 34 disposed in the door disposition area 22 of the airbag cover 20, and a general portion 33 disposed in the general portion 21 of the airbag cover 20 around the door disposition area 34. The door disposition area 34 includes door constituent portions 35 (F, B), the space portions 47 (F, B) each having a rectangular opening and disposed on a base portion 35b side of each door constituent portion 35, a weak portion 36 disposed on a front end edge 35a and a side edge 35d of each of the door constituent portions 35F, 35B and constituting the breakable portion 27, and a peripheral edge coupling portion 48 coupled to the peripheral edge portion 51 of the retainer 50 (see FIG. 7).

The peripheral edge coupling portion 48 includes a front side portion 48a coupled to the front flange portion 52a in the flange portion 52 of the peripheral edge portion 51, a rear side portion 48b coupled to the rear flange portion 52b, a left side portion 48c coupled to the left flange portion 52c, and a right side portion 48d coupled to the right flange portion 52d. The left side portion 48c and the right side portion 48d extend to vertical bar portions 56bL, 56bR of the gap 56 of the retainer 50, and are provided with inner protruding portions 48ca, 48da which are disposed in the vicinity of the left and right side edges 35d of the door constituent portions 35F, 35B (see FIGS. 2, 3, 6, and 7). The inner protruding portions 48ca, 48da are configured to couple the inner side protruding portions 52ca, 52da of the retainer 50 at a lower side of a portion on the weak portion 36 side.

Figure 5:
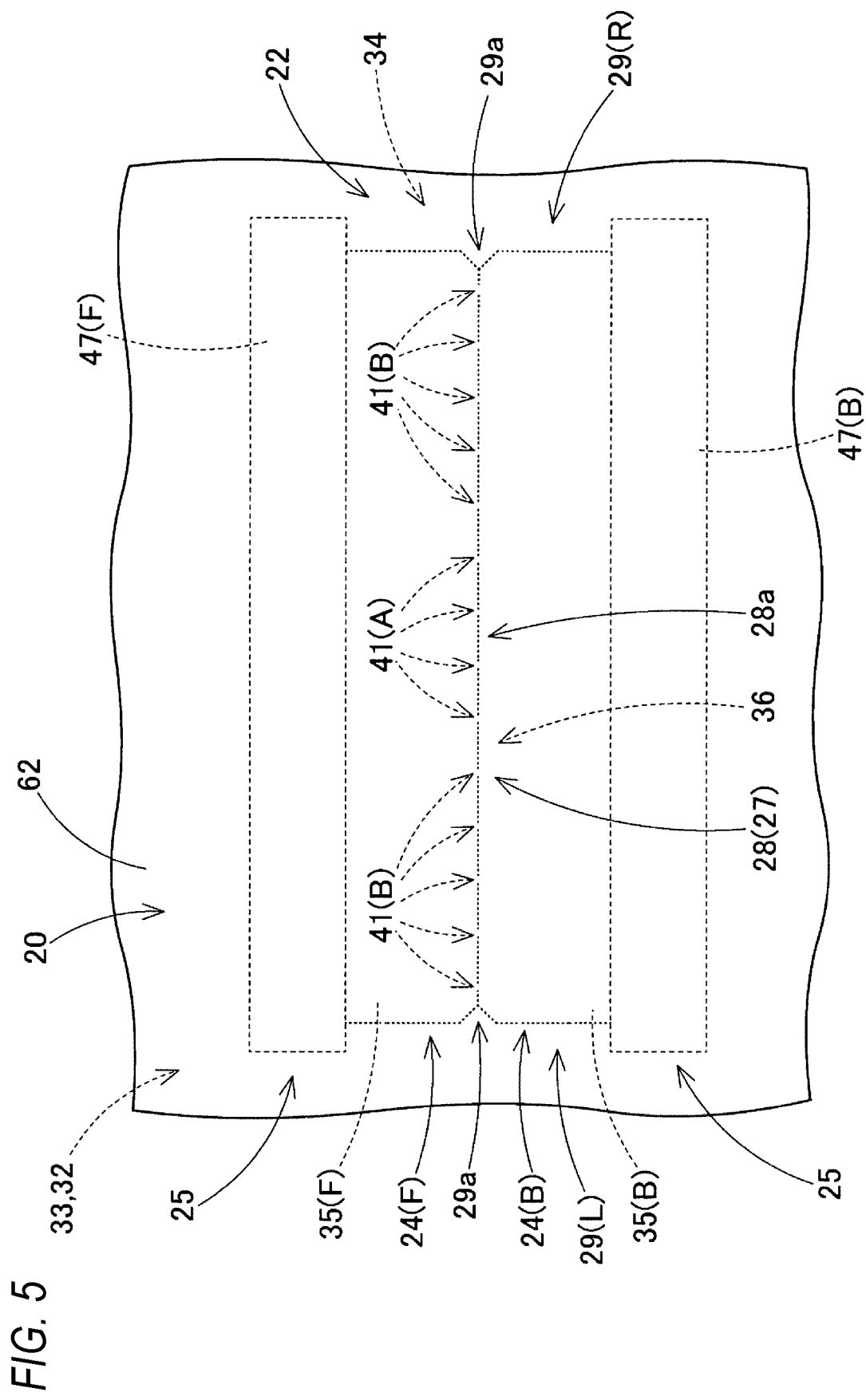
FIG. 5 is a plan view of the vicinity of a disposition area of a door portion in the airbag cover according to the embodiment.
Figure 6:
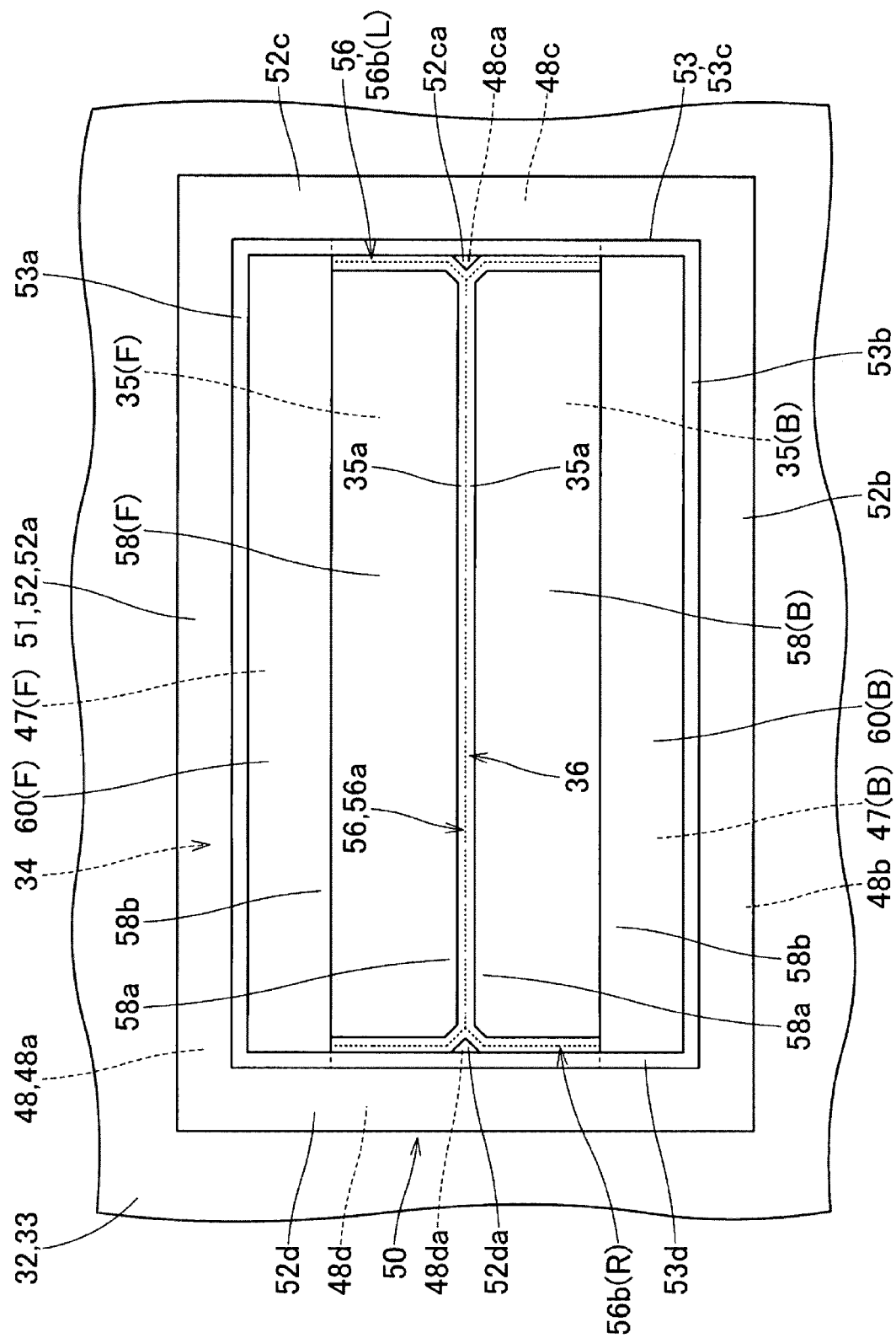
FIG. 6 is a bottom view of the vicinity of the disposition area of the door portion in the airbag cover according to the embodiment.
Figure 7:
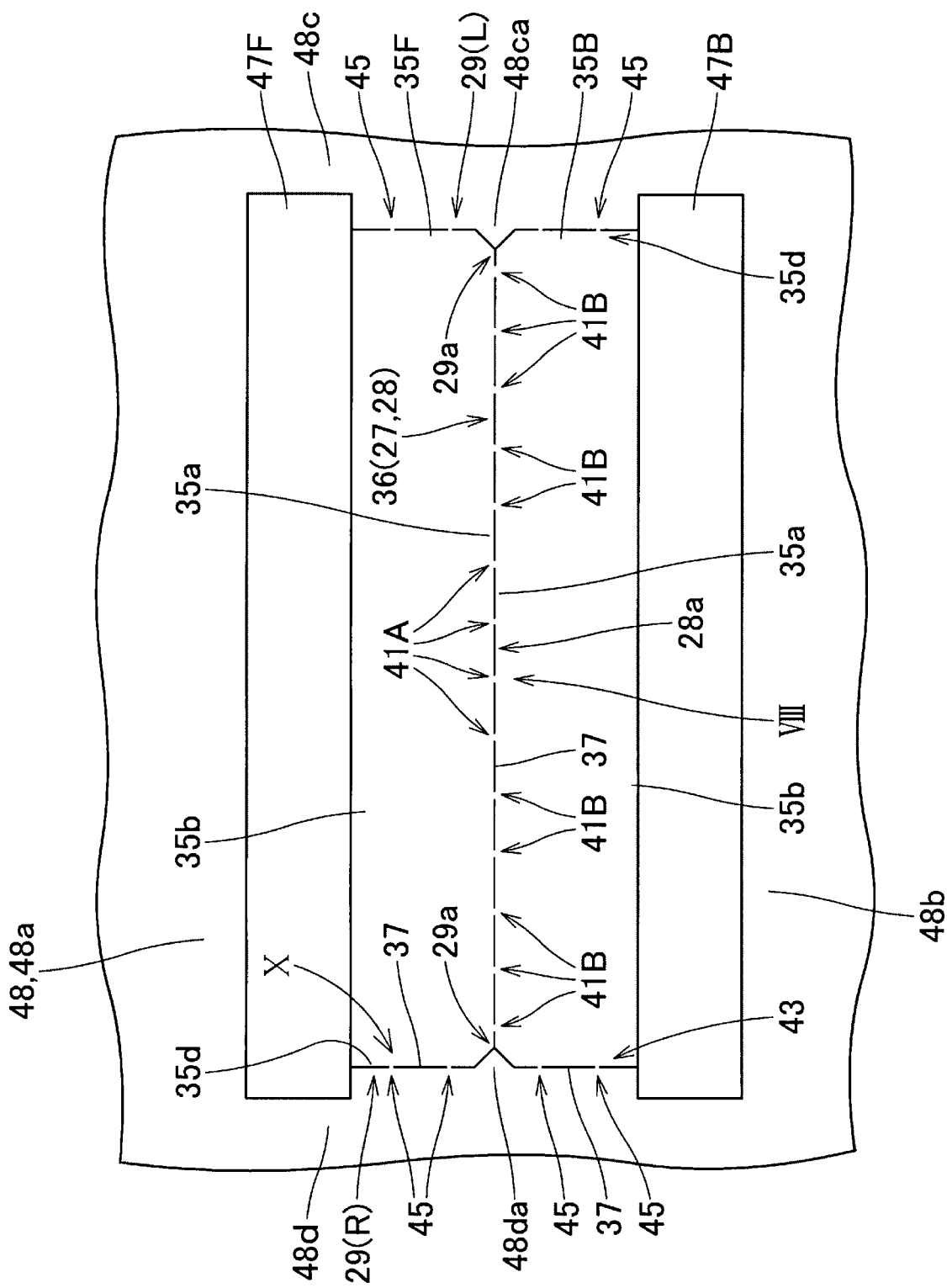
FIG. 7 is a bottom view illustrating a portion of a breakable portion of a base material according to the embodiment.

The weak portion 36 constituting the breakable portion 27 includes, along the horizontal line portion 28 and the vertical line portions 29 (L, R) of the breakable portion 27 having the substantially H shape, a plurality of strip-shaped breakable openings 37, and a plurality of breakable coupling portions 41 (A, B), and 45 disposed to close gaps between the breakable openings 37 and broken when the airbag 11 is inflated (see FIGS. 5 and 7).

Figure 9:
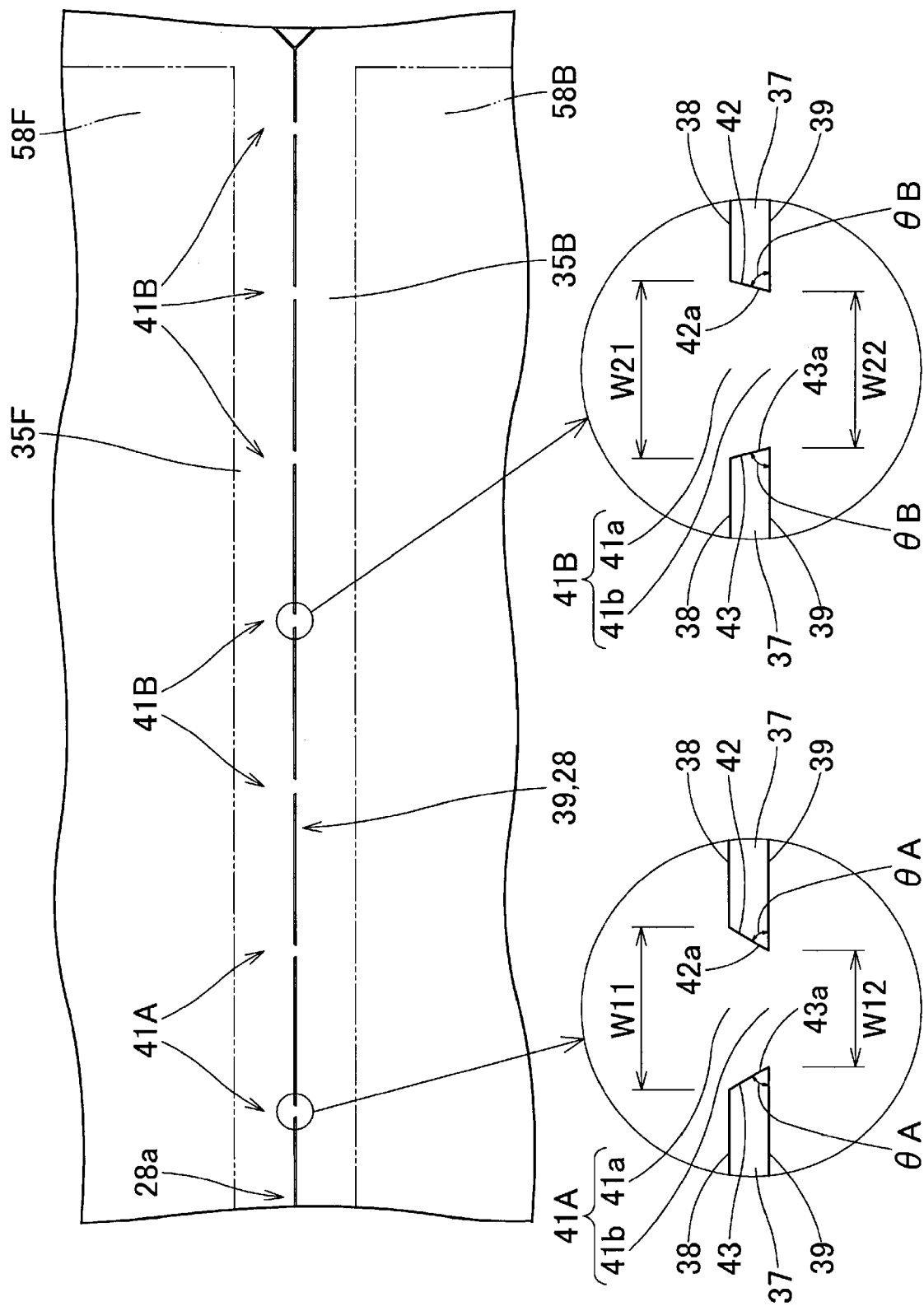
FIG. 9 is a schematic enlarged bottom view illustrating the vicinity of the breakage starting point portion of the breakable portion in the base material according to the embodiment.
Figure 10A:
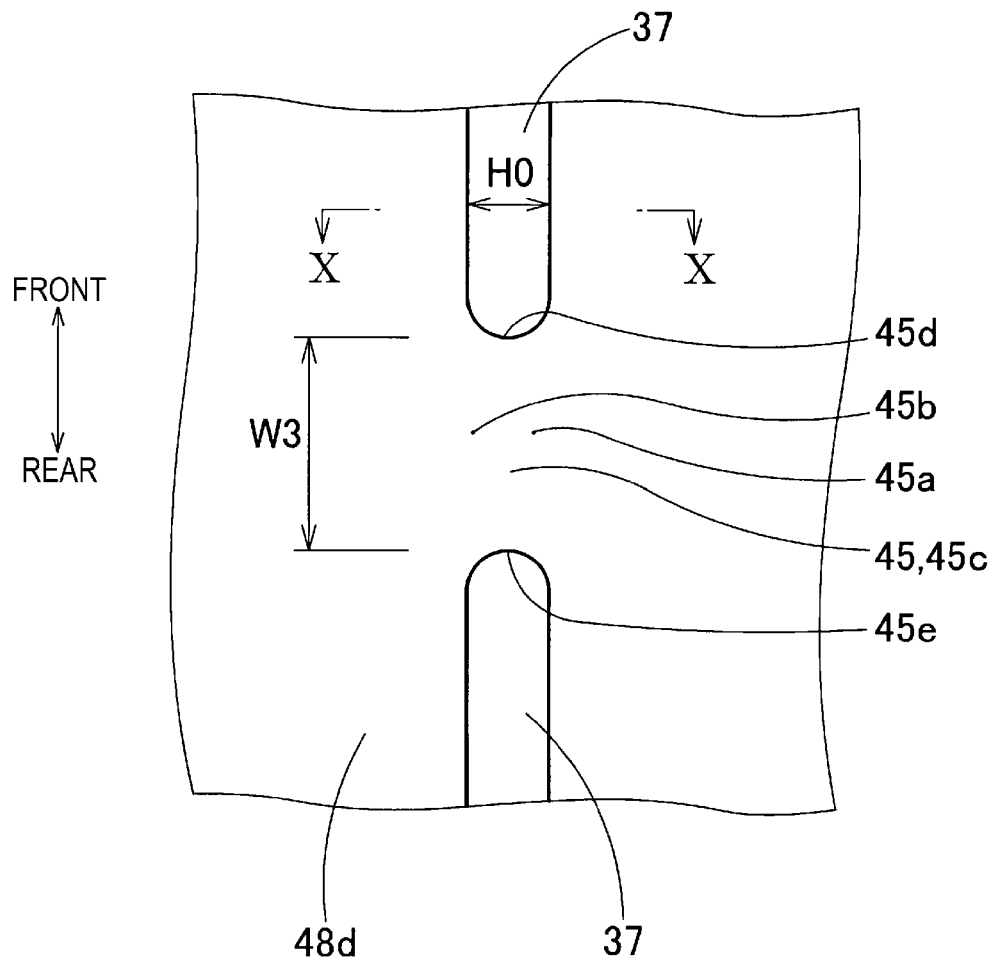
FIG. 10A is a schematic enlarged bottom view illustrating the vicinity of a side edge of the door portion in the base material according to the embodiment and corresponds to a portion X in FIG. 7.
Figure 10B:
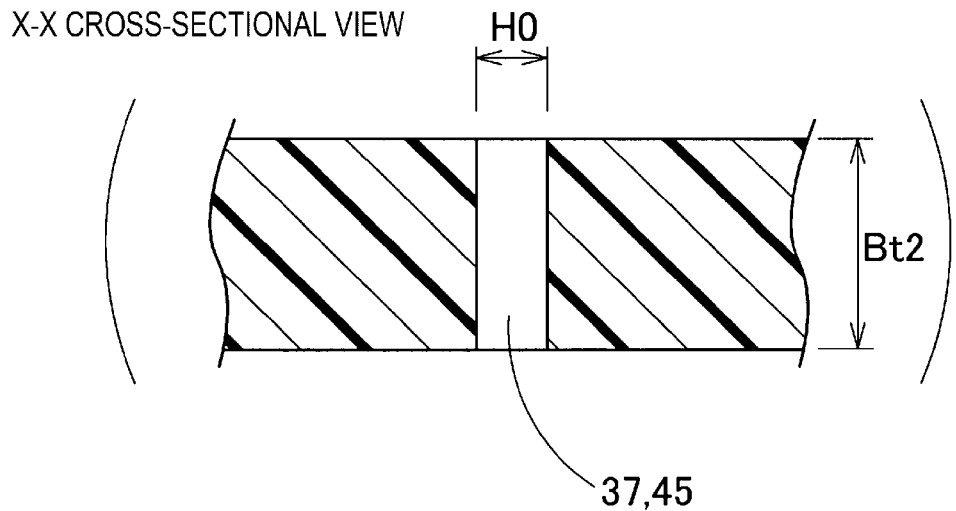
FIG. 10B illustrates a schematic cross-sectional view of the vicinity of the portion.

Then, in a portion of the horizontal line portion 28 of the breakable portion 27, the breakable coupling portions 41 (A, B) are disposed to close the breakable openings 37 (see FIGS. 8A to 9), and in portions of the vertical line portions 29 (L, R), the breakable coupling portions 45 are disposed to close the breakable openings 37 (see FIGS. 10A and 10B).

In the case of the embodiment, the vicinity of a central part 28a of the horizontal line portion 28 in the left-right direction is a breakage starting point portion when the door portions 24 (F, B) are opened.

Figure 8A:
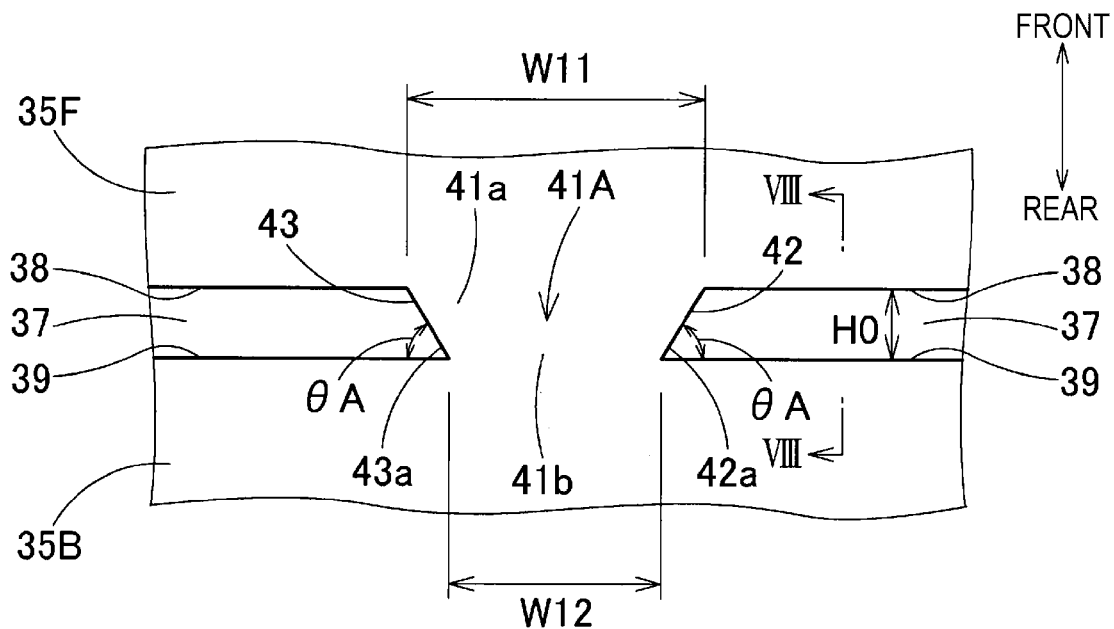
FIG. 8A is a schematic enlarged bottom view illustrating the vicinity of a breakage starting point portion of the breakable portion in the base material according to the embodiment and corresponds to a portion VIII in FIG. 7.
Figure 8B:
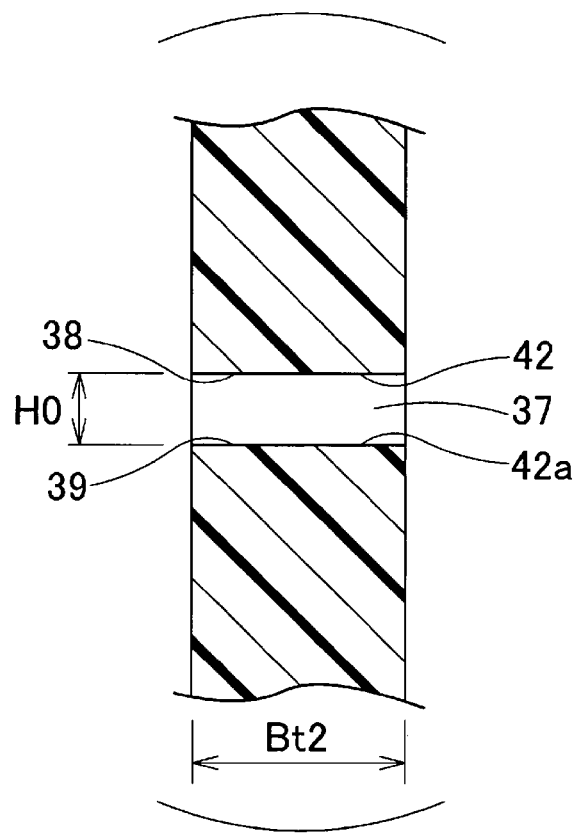
FIG. 8B illustrates a schematic cross-sectional view of the vicinity of the portion.

The breakable coupling portions 41 (A, B) disposed in the horizontal line portion 28 are disposed such that a width dimension between the adjacent breakable openings 37, 37 in a plan view is smaller on a separated front end portion 41b side than on a base portion 41a side, which is a front end edge 35a side of the door constituent portion 35F on the front portion side (see FIGS. 8A to 9). That is, in the breakable coupling portions 41 (A, B), in the plan view, width dimensions W11, W21 of the base portion 41a on the front side are wider than width dimensions W12, W22 of the front end portion 41b on a rear side.

In the case of the embodiment, fourteen breakable coupling portions 41 (A, B) are disposed on the horizontal line portion 28, four breakable coupling portions 41A are disposed in the area near the central part 28a, and five breakable coupling portions 41B shifted from the central part 28a are disposed on each of the left and right sides.

In the breakable coupling portion 41A in the vicinity of the central part 28a, among intersection angles between side edges 42, 43 in a width direction (left-right direction) on adjacent breakable openings 37, 37 sides, and facing edges 38, 39 facing each other in a front-rear direction of the breakable opening 37, an intersection angle θA on the front end portion 41b side is an acute angle (about 60° in the case of the embodiment).

Further, as illustrated in FIG. 9, in the breakable coupling portion 41B on the vertical line portions 29 (L, R) sides deviated to the left and right from the central part 28a in the left-right direction of the horizontal line portion 28, among intersection angles between the side edges 42, 43, in the width direction (left-right direction) on the adjacent breakable openings 37, 37 sides, and the facing edges 38, 39 facing each other in the front-rear direction of the breakable opening 37, an intersection angle θB on the front end portion 41b side, which is a rear side (the door portion 24B side), is an acute angle (about 75° in the case of the embodiment), but is larger than that in the breakable coupling portion 41A.

A thickness dimension Bt2 of the base material 32 is about 3 mm, an opening width dimension H0 of the breakable opening 37 is about 1 mm, a width dimension W11 of the base portion 41a of the breakable coupling portion 41A is about 4.2 mm, a width dimension W12 of the front end portion 41b is about 3 mm, a width dimension W21 of the base portion 41a of the breakable coupling portion 41B is about 4.54 mm, and a width dimension W22 of the front end portion 41b is about 4 mm.

In addition, although the breakable coupling portions 45 disposed in the vertical line portions 29 (L, R) are disposed to close gaps between the adjacent breakable openings 37, the breakable coupling portions 45 are formed in a drum shape in a plan view, side edges 45d, 45e on the breakable openings 37 sides are formed in a semicircular arc shape, and a base portion 45a on the door constituent portions 35F, 35B sides and a front end portion 45b on the left side portion 48c and the right side portion 48d of the peripheral edge coupling portion 48 are formed in a symmetrical shape (see FIGS. 10A and 10B). Two drum-shaped breakable coupling portions 45 are disposed on each of the left and right side edges 35d of the door constituent portions 35F, 35B, and when each of the breakable coupling portions 45 breaks due to the inflation of the airbag 11, the vicinity of an intermediate portion 45c between the base portion 45a on door portions 24 (F, B) sides and the front end portion 45b on a side away from the door portions 24 (F, B) having a narrow width dimension breaks. A width dimension W3 of the intermediate portion 45c is about 3 mm.

The vertical line portions 29 (L, R) are formed such that a front portion side is disposed on a side edge 35b side of the front door constituent portion 35F, a rear portion side is disposed on a side edge 35d side of the rear door constituent portion 35B, and at a central part 29a in the front-rear direction, the breakable opening 37 extends from the breakable coupling portion 41 on the horizontal line portion 28 side to both of the front and rear sides in a Y-shaped bifurcated shape, and the breakable opening 37 extends in the front-rear direction with the breakable coupling portions 45 interposed therebetween (see FIGS. 5 and 7).

In the front and rear door constituent portions 35 (F, B) of the base material 32, the base portion 35b sides on the space portions 47 (F, B) sides are formed as tapered portions 35c (see FIGS. 2 and 3) which become thinner toward the space portions 47 (F, B) sides, and the front end edge 35a sides are each formed in a flat plate shape having the same thickness dimension across the horizontal line portion 28 of the breakable portion 27 in the weak portion 36. Except for the tapered portions 35c in the base material 32, the thickness dimension Bt2 of the door constituent portions 35 (F, B) and the door disposition area 34 of the peripheral edge coupling portion 48 is approximately 3 mm, which is equal to the thickness dimension Bt1 of the general portion 33.

Figure 3:
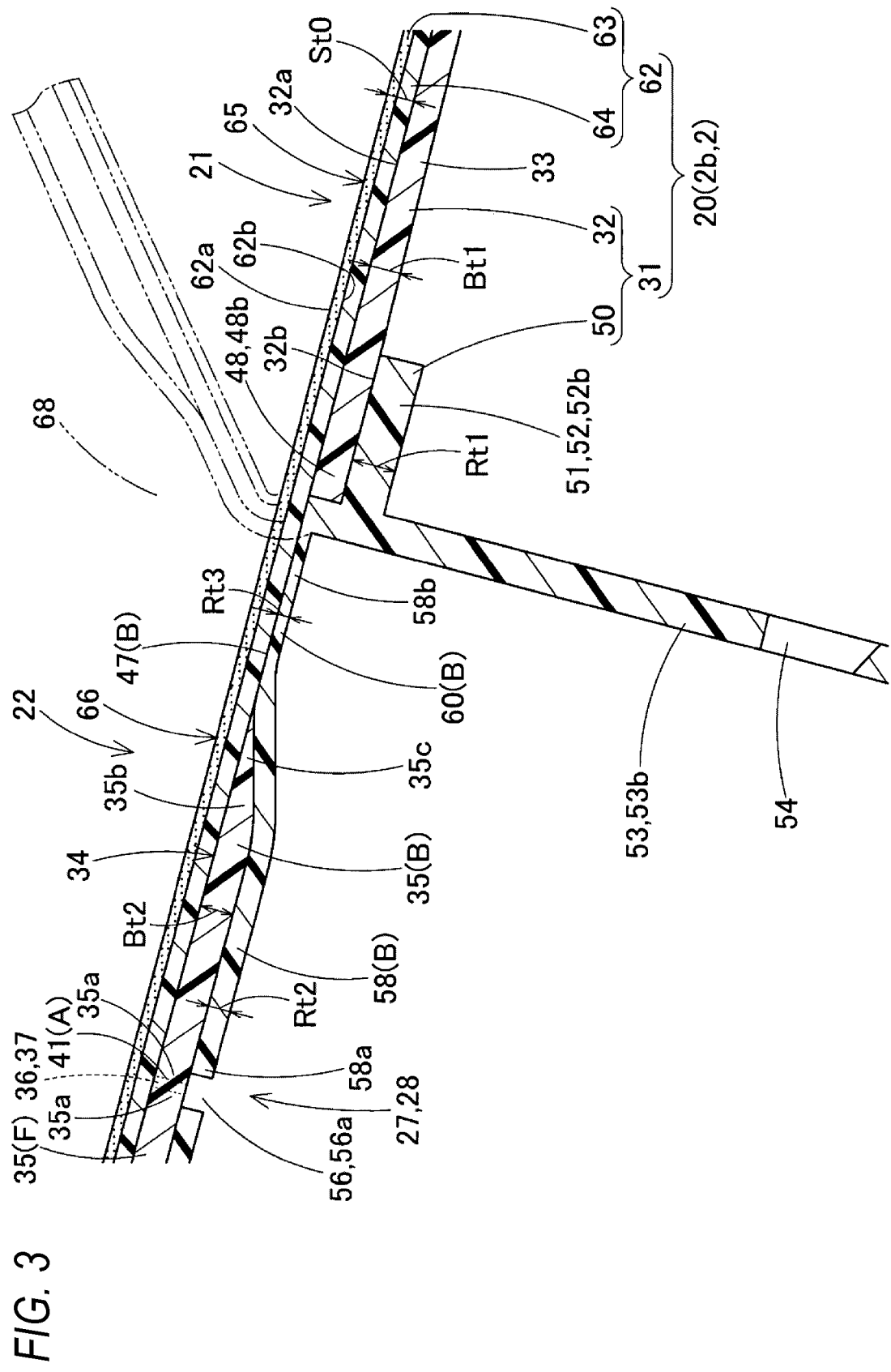
FIG. 3 is a schematic partially enlarged longitudinal cross-sectional view of the airbag device according to the embodiment taken along the front-rear direction.

In the retainer 50, a thickness dimension Rt1 of the flange portion 52 is set to about 4 mm, a thickness dimension Rt2 of the door support portions 58 (F, B) is set to about 2 mm, and a thickness dimension Rt3 of the hinge portions 60 (F, B) is set to about 1 mm within a range of about 0.5 to 1.5 mm (see FIG. 3).

A thickness St0 of the skin layer 62 is set to about 2.6 mm.

Figure 11:
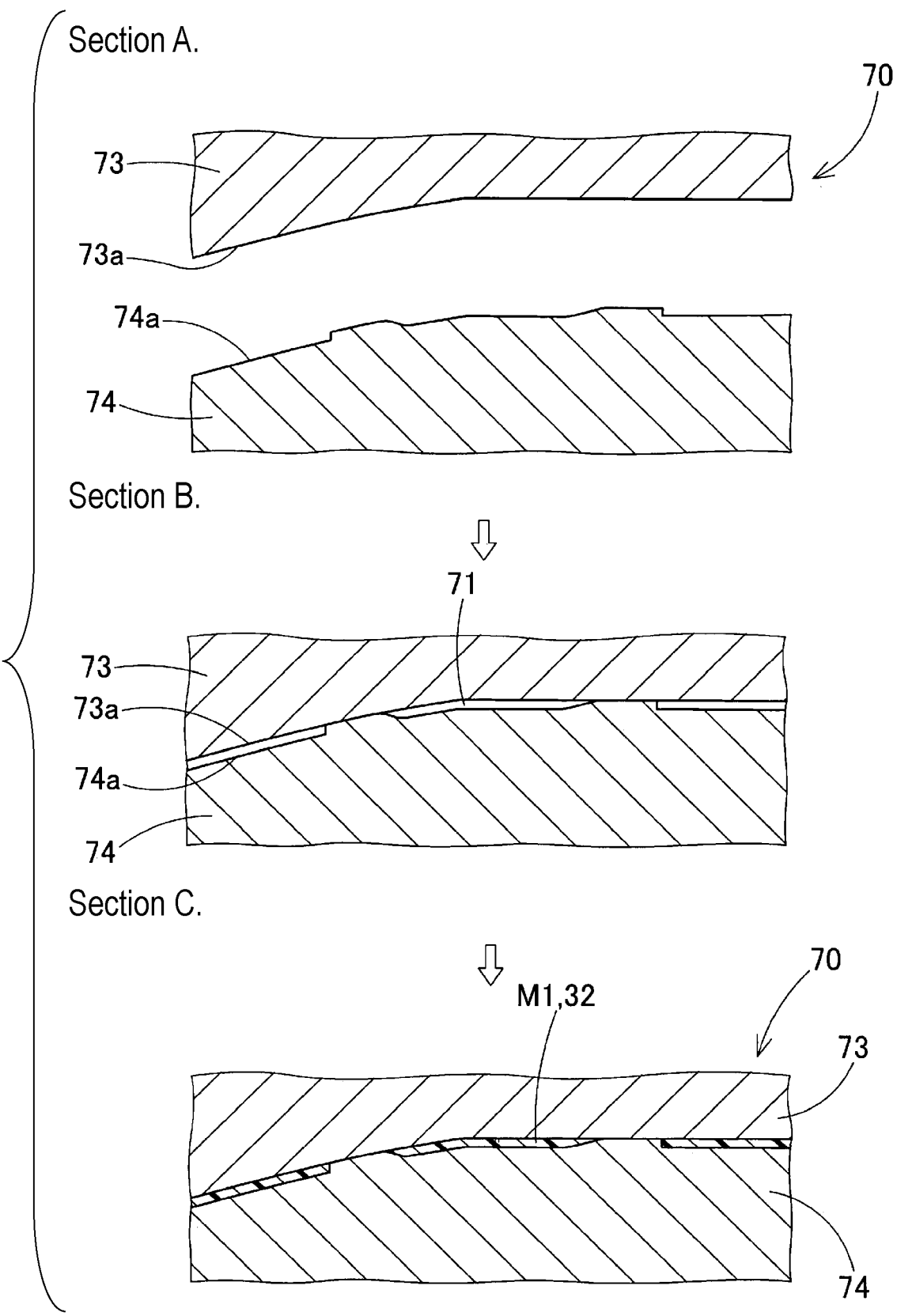
FIG. 11 is a diagram illustrating a process of manufacturing the airbag cover according to the embodiment, and illustrates a process of manufacturing the base material.
Figure 12:
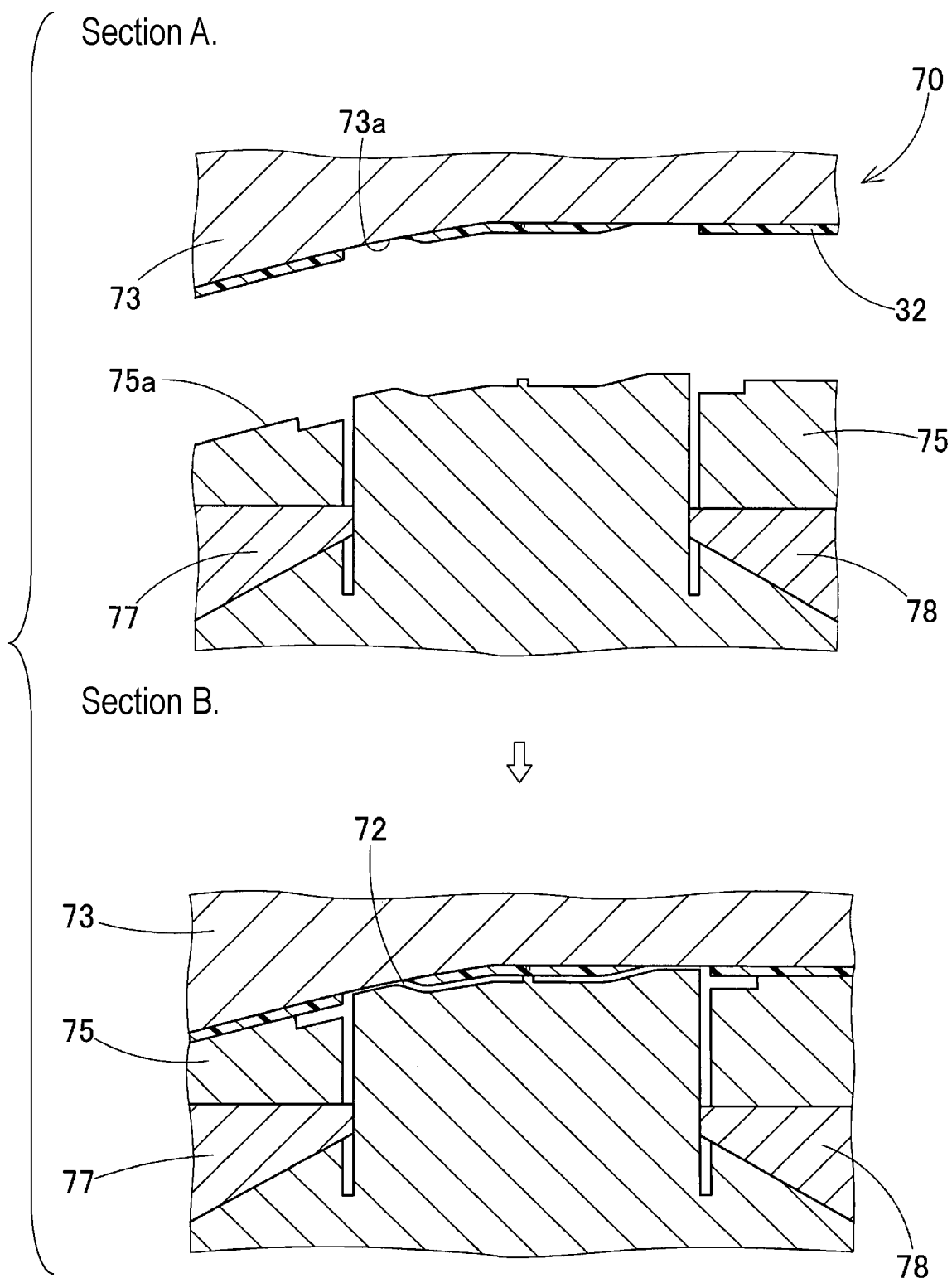
FIG. 12 is a diagram illustrating a process of manufacturing the airbag cover according to the embodiment, and illustrates a process of manufacturing a retainer.
Figure 13:
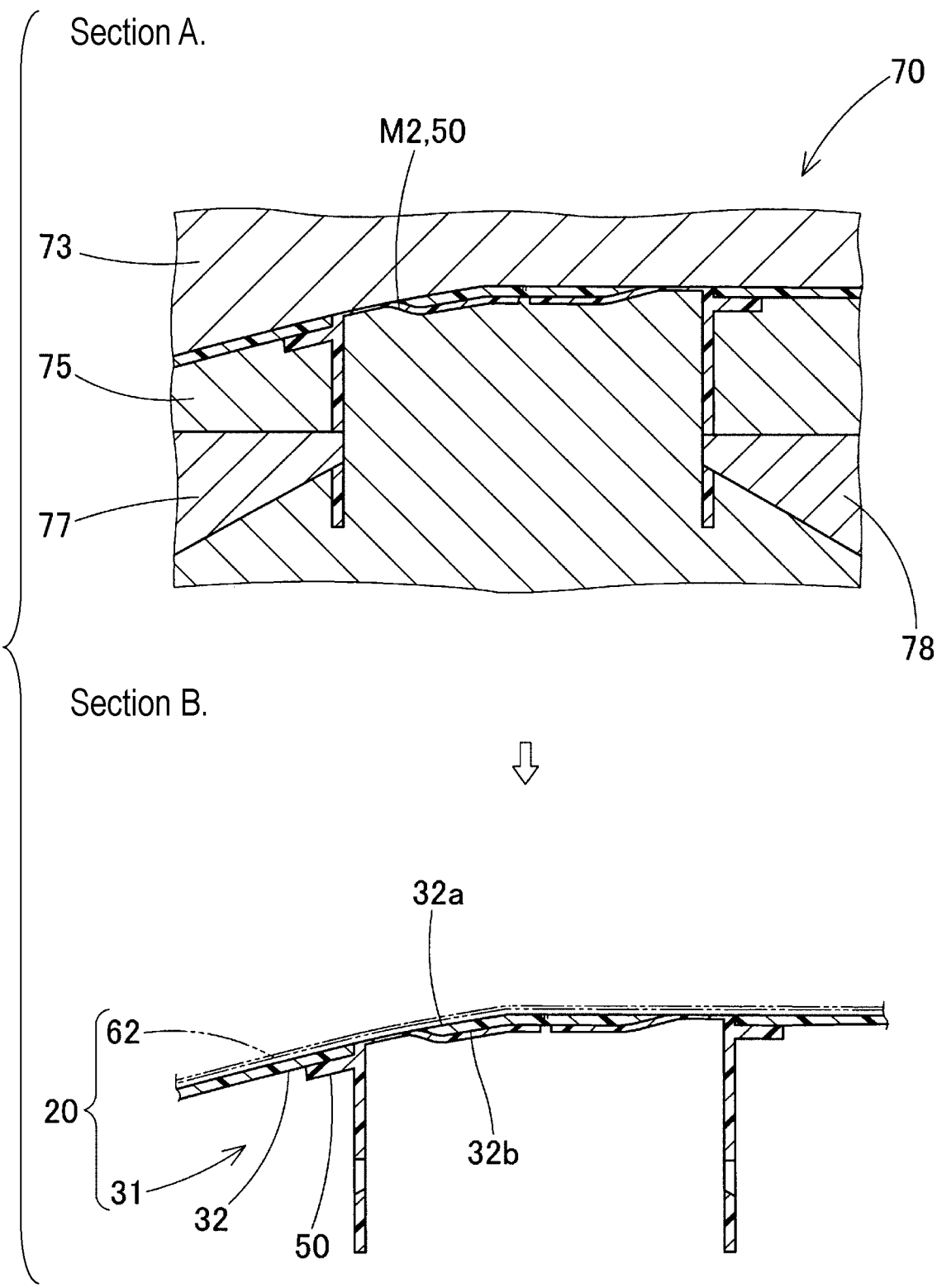
FIG. 13 is a diagram illustrating a process of manufacturing the retainer in the process after the process illustrated in FIG. 12 and further illustrating a process of bonding a skin layer.

When the airbag cover 20 is manufactured, first, the airbag cover main body 31 is molded. As illustrated in FIGS. 11 to 13, a molding mold 70 can be two-color molded using molding materials M1, M2 of the base material 32 and the retainer 50, and includes split molds 73, 74 capable of molding the base material 32 and a split mold 75 capable of molding the retainer 50 by sharing the split mold 73. When the split molds 73, 74 are closed, a cavity 71 capable of molding the base material 32 is formed from mold surfaces 73a, 74a, and the base material 32 can be formed by injecting the predetermined molding material M1 into the cavity 71 and solidifying the molding material M1. Thereafter, in a state where the split molds 73, 74 are opened and the base material 32 is held on the split mold 73 side, the split mold 74 is replaced with the split mold 75, and the split molds 73, 75 are clamped, whereby a cavity 72 capable of molding the retainer 50 is formed from mold surfaces 73a, 75a, and the retainer 50 can be formed in a state of being coupled to the base material 32 by injecting the predetermined molding material M2 into the cavity 72 and solidifying the molding material M2. Then, the airbag cover 20 can be manufactured by opening the molds while sliding slide cores 77, 78, taking out the airbag cover main body 31 formed as a two-color molded product, and bonding the skin layer 62.

The weak portion 36 and the space portions 47 (F, B) of the base material 32 forming the breakable portion 27 are integrally formed when the base material 32 is molded by the split molds 73, 74.

In assembling the airbag device 10 using the airbag cover 20 manufactured as described above, first, in a state where the retainer 12 is accommodated in the airbag 11, the airbag 11 is folded, the folded airbag 11 is wrapped with a wrapping material (not illustrated), and the airbag 11 is accommodated in the attachment base 15. At this time, each bolt 12a of the retainer 12 protrudes downward from the bottom wall portion 16 of the attachment base 15. Then, the main body portion 14a of the inflator 14 is inserted into the insertion hole 16a of the attachment base 15 from below, each bolt 12a of the retainer 12 penetrates the flange portion 14c of the inflator 14, and the nut 13 is fastened to each bolt 12a, whereby the folded airbag 11 and the inflator 14 can be attached and fixed to the attachment base 15.

Thereafter, the instrument panel 2 is fixed to the body side of the vehicle 1, the locking hooks 17a of the attachment base 15 are inserted into and locked to the locking holes 54 of the coupling wall portion 53 of the retainer 50 of the airbag cover 20, a lead wire (not illustrated), which inputs an operation signal and extends from a predetermined control device, is coupled to the inflator 14, and the attachment base 15 is attached and fixed to the body side of the vehicle 1 by using a predetermined bracket, whereby the airbag device 10 can be mounted on the vehicle 1.

In the airbag device 10 mounted on the vehicle 1 as described above, when the inflator 14 is operated to discharge the inflation gas G, the airbag 11 is inflated by causing the inflation gas G to flow into the airbag 11. Then, when the airbag 11 is inflated, the airbag cover 20 breaks the breakable coupling portions 41 (A, B), 45 in the weak portion 36 of the base material 32 constituting the breakable portion 27, and the door portions 24 (F, B) bend the hinge portions 60 (F, B) of the retainer 50 of the hinge part 25, pushes and opens the skin layer 62 while breaking the skin layer 62, opens the protruding opening 68, whereby the airbag 11 protrudes from the protruding opening 68 (see a two-dot chain line in FIG. 2).

In the airbag cover 20 of the embodiment, the hinge part 25 when the door portions 24F, 24B are opened includes, as a non-disposition portion of the base material 32 provided with the space portions 47 (F, B), two layers, that is, the skin layer 62 having flexibility and the hinge portions 60 (F, B) of the retainer 50 made of a synthetic resin softer than the base material 32, in which the base material 32 is not disposed. Therefore, when the door portions 24F, 24B are opened, the base material 32 itself is not bent, so that the hinge part 25 is smoothly bent and the door portions 24F, 24B are opened. Further, the surface of the airbag cover main body 31 including the base material 32 and the retainer 50 includes the hinge part 25 and is provided with the skin layer 62, and the base material 32 including the space portions 47 (F, B) is not exposed to the surface side, so that design of the airbag cover 20 is improved.

Therefore, in the airbag cover 20 of the embodiment, opening performance of the door portions 24 (F, B) can be improved, and the design can be improved.

Since the base portions 35b of the door constituent portions 35 (F, B) of the base material 32 are provided with the tapered portions 35c toward the hinge portions 60 (F, B) sides of the retainer 50 to be gradually thinned to form the space portions 47 (F, B), the base material 32 harder than the retainer 50 does not inhibit the bending performance of the hinge portions 60 (F, B) of the retainer 50, and the door portions 24 (F, B) can be smoothly opened.

In the airbag cover 20 of the embodiment, the door portions 24 (F, B) includes three layers, that is, the skin layer 62, the door constituent portions 35 (F, B) of the base material 32, and the door support portions 58 (F, B) of the retainer 50 disposed from an outer surface side.

Therefore, in the embodiment, the door portions 24 (F, B) are configured such that the base material 32 is disposed on a back surface side of the skin layer 62 on the front surface side similarly to the area of the general portion 21 excluding the door disposition area 22 of the door portions 24 (F, B) in the airbag cover 20, that is, the area of the general portion 21 in which the retainer 50 is not provided, and the skin layer 62 of the door portions 24 (F, B) is supported by the base material 32 on the back surface side, so that tactile sensation of the door portions 24 (F, B) can be made equivalent to tactile sensation of the general portion 21.

Further, in the airbag cover 20 of the embodiment, the breakable portion 27, which is broken by being pushed by the inflating airbag 11, is disposed around the door portions 24 (F, B) except for the disposition portions of the hinge portions 60 (F, B), and the breakable portion 27 includes, as a non-disposition portion of the retainer 50 two layers, that is, the skin layer 62 and the base material 32 provided with the weak portion 36.

Therefore, in the embodiment, since the breakable portion 27 to be broken when the door portions 24 (F, B) are opened is configured without disposing the portion of the retainer 50, the breakable portion 27 that is opened by being pushed by the inflating airbag 11 includes only two layers, that is, the breakable skin layer 62 and the base material 32 which is easily broken and provided with the weak portion 36, the breakable portion 27 is smoothly broken when the door portions 24 (F, B) are opened, and the opening performance of the door portions 24 (F, B) can be stabilized.

Further, in the airbag cover 20 of the embodiment, the retainer 50 is configured such that the peripheral edge portion 51 is provided with the coupling wall portion 53 which is coupled to the attachment base 15 of the airbag device 10 holding the folded airbag 11.

Therefore, in the embodiment, since the disposition area 22 of the door portions 24 (F, B) of the airbag cover 20 is coupled to the attachment base 15 holding the folded airbag 11 in the airbag device 10 via the coupling wall portion 53 extending from the peripheral edge portion 51 of the retainer 50, and when the airbag 11 is inflated, the peripheral edge portion 51 of the retainer 50 is coupled to the attachment base 15 of the airbag device 10 and does not move away from an attachment base 15 side, the door portions 24 (F, B) configured to be coupled to the peripheral edge portion 51 in the retainer 50 via the hinge portions 60 (F, B) can be quickly opened by appropriately receiving a pressing force of the inflating airbag 11.

If the above points are not taken into consideration, the coupling wall portion 53 and the like of the retainer 50 may be coupled to a member on a vehicle body side such as a surrounding instrument panel link hose.

Further, in the airbag cover 20 of the embodiment, the portion formed of three layers, that is, the skin layer 62, the base material 32 (the front side portion 48a and the rear side portion 48b of the peripheral edge coupling portion 48), and the retainer 50 (the front flange portion 52a and the rear flange portion 52b of the peripheral edge portion 51 of the retainer 50) is disposed in an outer area of the hinge portions 60 (F, B) in the disposition area 22 of the door portions 24 (F, B), that is, an area of the front flange portion 52a and the rear flange portion 52b.

Therefore, in the embodiment, even if the hinge portions 60 (F, B) of the retainer 50 are not coupled to the base material 32 in the airbag cover main body 31, the peripheral edge portion 51 of the retainer 50 is coupled to the base material 32, and even if a strong tensile force is applied to the hinge portions 60 (F, B) of the retainer 50 when the door portions 24 (F, B) are opened, the portions (the front flange portion 52a and the rear flange portion 52b) of the peripheral edge portion 51 in the vicinity of the hinge portions 60 (F, B) of the retainer 50 are coupled to the base material 32 (the front side portion 48a and the rear side portion 48b of the peripheral edge coupling portion 48) to prevent peel-off from the base material 32. Thus, the door portions 24 (F, B) can smoothly open the hinge part 25 (the hinge portions 60 (F, B) of the retainer 50) while bending the hinge part 25 without affecting the skin layer 62 or the like in the area of the general portion 21 where the retainer 50 is not provided in the airbag cover 20.

Further, in the airbag cover 20 of the embodiment, in the weak portion 36 constituting the breakable portion 27, when the airbag 11 is inflated, the door portions 24 (F, B) are pushed by the inflated airbag 11 to break the breakable coupling portion 41A in the vicinity of the central part 28a of the horizontal line portion 28, which is a starting point portion of the breakable portion 27. The breakable coupling portion 41A which is broken is broken due to stress concentration on a narrow side of the width dimension W12. At this time, since the breakable coupling portion 41A breaks the front end portion 41b side having the narrow width dimension W12 while leaving the base portion 41a side having the wide width dimension W11 close to the front end edge 35a in the door constituent portion 35F of the door portion 24F on the front side, as illustrated in section A and section B of FIG. 14, an edge angle 41bb of a front surface 32a of the base material 32 on a broken surface 41ba on the front end portion 41b side having the narrow width dimension W12 is brought into contact with a back surface 62b side of the skin layer 62 with the hinge portion 60F as a rotation center in accordance with the opening of the door constituent portion 35F as the door portion 24F, and pushes up the skin layer 62. That is, as illustrated in section A, section B and section C of FIG. 14, while the breakable coupling portion 41A is coupled to the front end edge 35a of the door constituent portion 35F in the door portion 24F, the edge angle 41bb on the front end portion 41b side where the width dimension W12 is narrow bites into the skin layer 62 like a knife protruding from the front end edge 35a of the door constituent portion 35F, and the skin layer 62 can be smoothly broken. As a result, as the door constituent portion 35F of the base material 32 is opened, the skin layer 62 is rapidly broken from the front end edge 35a side of the door constituent portion 35F, and the breakage is propagated to the peripheral edge of the door constituent portion 35F, so that the protruding opening 68 of the airbag 11 is smoothly formed together with the door portion 24B (see the two-dot chain line in FIG. 2). Since a protrusion or the like is not provided on the skin layer 62, the door constituent portion 35 does not affect design of the front surface 62a side of the skin layer 62.

Then, in the airbag cover 20 of the embodiment, the breakable coupling portion 41A in the vicinity of the central part 28a of the horizontal line portion 28, which is the breakage starting point portion, couples end edges 42a, 43a on the front end portion 41b side, in which the width dimension W12 of both the edges 42, 43 sides in the width direction is reduced, to the edge 39 on the breakable opening 37 side, which is to be coupled, in an acute angle shape in the plan view (see FIGS. 8A to 9).

Therefore, in the embodiment, if the breakable coupling portion 41A in the vicinity of the central part 28a, which is the starting point portion, is coupled to the edge 39 of the adjacent breakable opening in the acute angle shape on the front end portion 41b side where the width dimension W12 is narrowed, stress concentration smoothly occurs in the portion when a tensile force accompanying the inflation of the airbag 11 is received, and the portion is easily broken. Further, since the end edges 42a, 43a on the breakable opening 37 side extending from the broken front end portion 41b are coupled to the edge 39 on the breakable opening 37 side in the acute angle shape before being broken, at the time of breaking, with pushing-up of the front end portion 41b of the breakable coupling portion 41A, the end edges 42a, 43a enter the back surface 62b side of the skin layer 62 in a pushing and cutting manner to be continuous from the edge angle 41bb on the broken end surface (broken surface) 41ba side of the front end portion 41b, the breakage from the breakable portion due to the pushing-up of the front end portion 41b is easily propagated, and the skin layer 62 can be smoothly broken from the vicinity of the central part 28a, which is the breakage starting point portion, along the breakable portion 27.

Further, in the airbag cover 20 of the embodiment, as illustrated in FIG. 9, in the vicinity of the central part 28a at the break starting point of the breakable portion 27, the degree of the acute angle in the vicinity of the central part 28a is increased by setting the intersection angle θA between the end edges 42a, 43a of the front end portion 41b having the narrow width dimension W12 of the side edges 42, 43 and the edge 39 of the breakable opening 37 to about 60° in the breakable coupling portion 41A, and setting the intersection angle θB between the edges 42a, 43a of the front end portion 41b having the narrow width dimension W22 of the side edges 42, 43 and the edge 39 of the breakage opening 37 to about 75° in the breakable coupling portion 41B separated from the central part 28a. Therefore, when the airbag 11 is inflated, the vicinity of the central part 28a in the left-right direction of the horizontal line portion 28, in which the breakable coupling portion 41A having an increased acute angle of the intersection angle θA is disposed, is easily broken, the stress concentration more easily occurs in the portion than in other portions, the vicinity of the central part 28a is accurately broken as the breakage starting point portion, and the door constituent portions 35 (F, B) of the door portions 24 (F, B) can smoothly rotate and open the front end edge 35a side around the hinge portions 60 (F, B) as the rotation center.

In the embodiment, regarding the intersection angle between the end edges 42a, 43a on the front end portion 41b side of the breakable coupling portions 41 (A, B) and the edge 39 of the breakable opening 37, as two types of the intersection angle θA (about 60°) and the intersection angle θB (about 75°), a case in which the small intersection angle θA is disposed at the central part 28a side which is the breakage starting point portion is described. However, as long as the central part 28a of the horizontal line portion 28 is configured to be set as the breakage starting point portion, the front end portion 41b of the breakable coupling portion 41 may be disposed such that the entire area of the horizontal line portion 28 has the same acute intersection angle. Further, regarding the intersection angles θA, θB between the end edges 42a, 43a on the side edges 42, 43 of the breakable coupling portion 41 and the edge 39 of the breakable opening 37, as long as at least one of the intersection angles θA, θB is an acute angle, the intersection angles θA, θB may not be equal to each other and the other may be an obtuse angle around 90°, and further, as long as the intersection angles θA, θB are acute angles, the intersection angles θA, θB may not be equal to each other.

Further, as in the embodiment, when the acute intersection angle is sequentially increased as a distance from the breakage starting point portion (central part 28a) side increases, in addition to the two stages as in the embodiment, the intersection angle may be set to increase sequentially in multiple stages from the intersection angle in the vicinity of the breakage starting point portion.

Further, the airbag cover 20 of the embodiment is formed by being disposed on the instrument panel 2 in front of the front seat of the vehicle 1 in a state where the wide base portion 41a side of the breakable coupling portions 41 (A, B) is disposed on the front door portion 24F.

Figure 14:
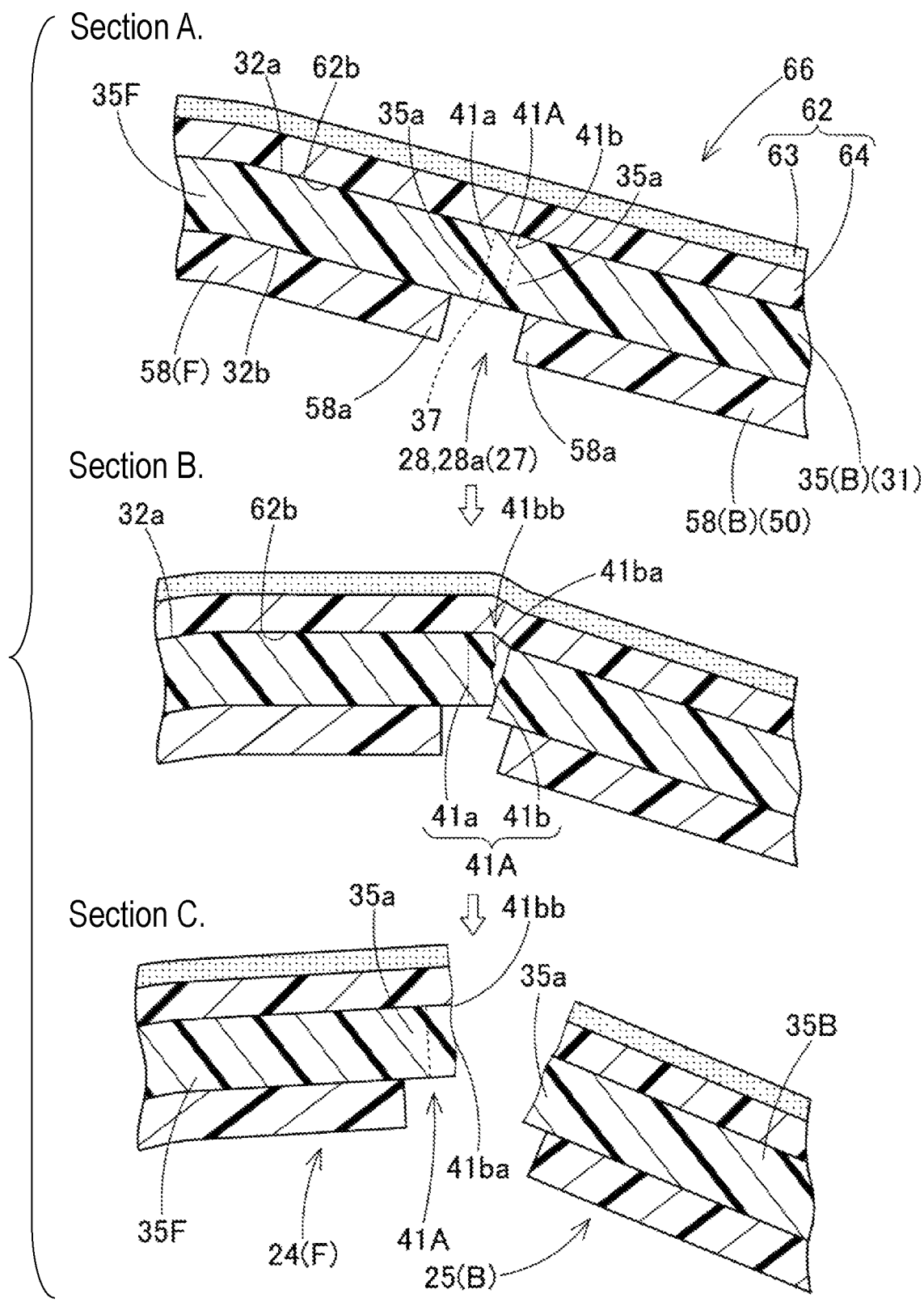
FIG. 14 illustrates schematic enlarged longitudinal cross-sectional views illustrating an initial stage of opening the door portion in the airbag cover according to the embodiment.

Therefore, in the embodiment, when the door portions 24F, 24B are opened with the inflation of the airbag 11, since the breakable coupling portions 41A, 41B break the front end portion 41b side of the narrow width dimensions W12, W22 on the front end edge 35a side of the door portion 24F, that is, in a state where the breakable coupling portions 41A, 41B are coupled to the front door portion 24F side and the breakable coupling portions 41A, 41B are not coupled to the rear door portion 24B side, the door portions 24F, 24B are opened (see the two-dot chain line in FIG. 2), and the door portion 24B on the rear side close to the occupant is opened in a state where the breakable coupling portions 41A, 41B are not coupled to the front end edge 35a side at the time of opening (see section C of FIG. 14). Therefore, even if the rear door portion 24B comes into contact with the occupant when the rear door portion 24B is opened, the front end edge 35a side with less unevenness can be brought into contact with the occupant.

Figure 15:
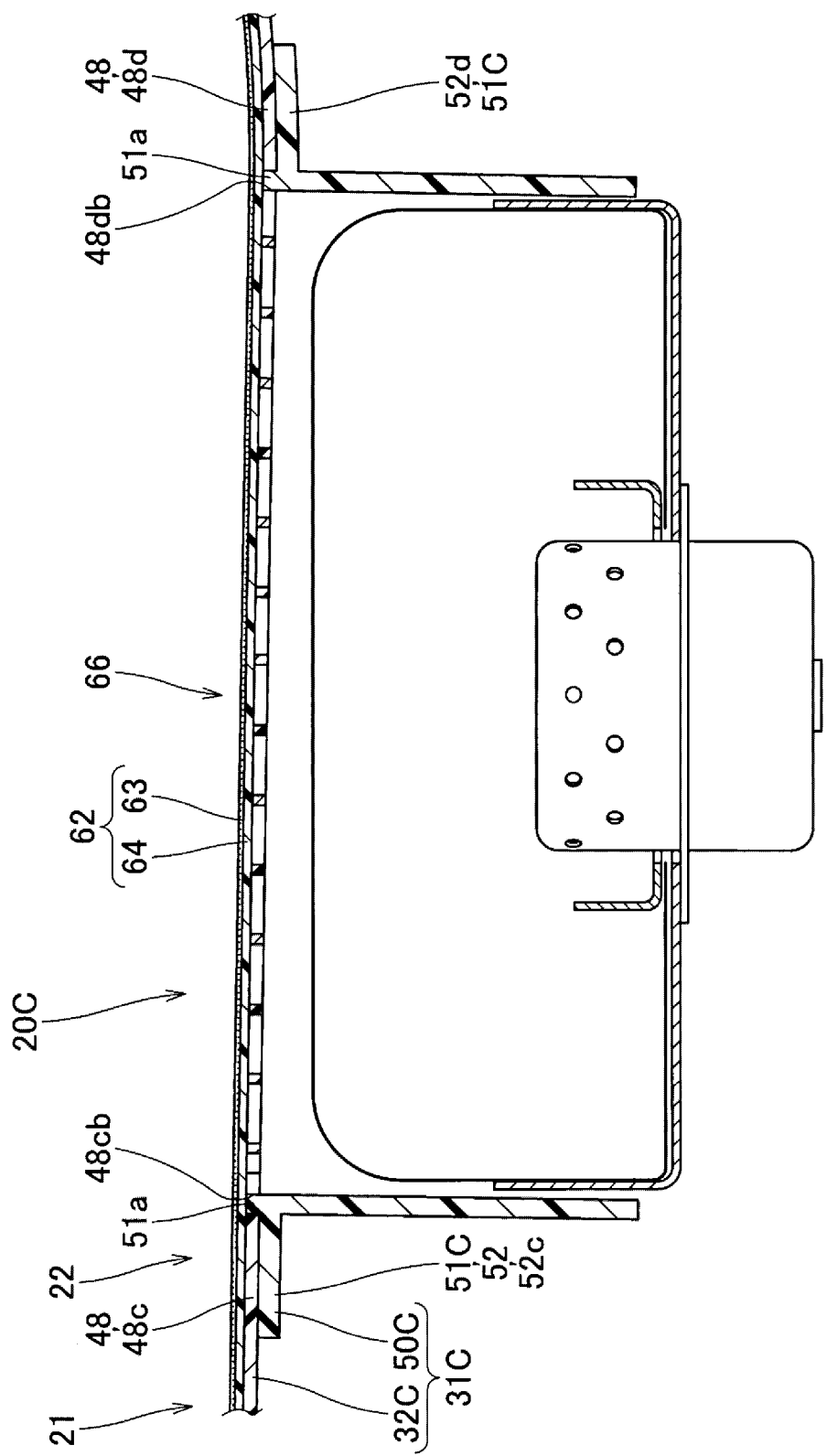
FIG. 15 is a schematic longitudinal cross-sectional view of an airbag device using an airbag cover according to a modification taken along a left-right direction.
Figure 16:
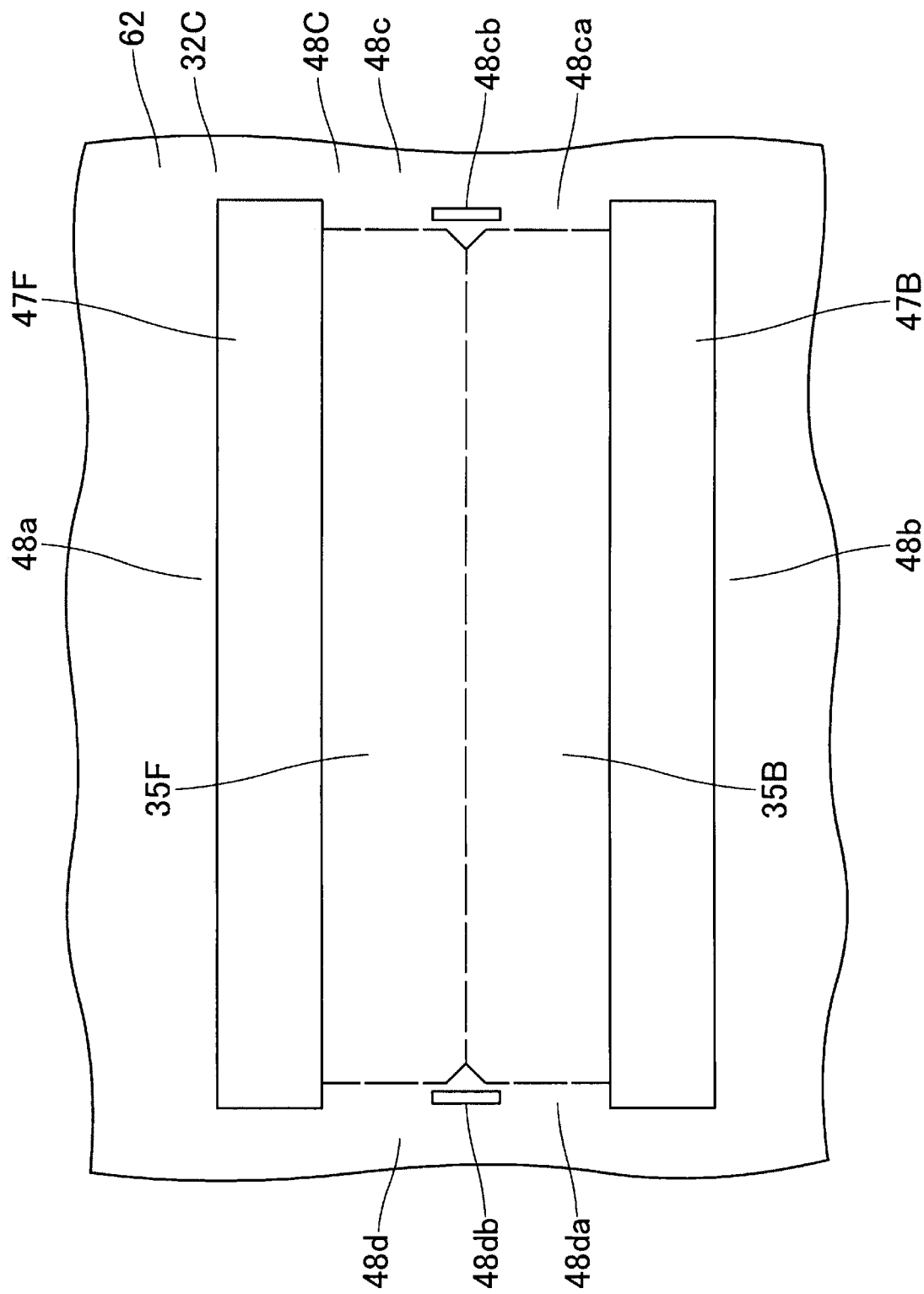
FIG. 16 is a plan view of a base material in the vicinity of a disposition area of a door portion of the airbag cover illustrated in FIG. 15.

Further, in the embodiment, the configuration in which the door constituent portions 35 (F, B) and the peripheral edge coupling portion 48 of the base material 32 are coupled to the door support portions 58 (F, B) and the peripheral edge portion 51 of the retainer 50 in a substantially planar shape is exemplified, but the airbag cover may be configured as an airbag cover 20C illustrated in FIGS. 15 and 16 to improve a coupling strength (bond strength) with the retainer 50 in the vicinity of the door constituent portions 35 (F, B) of the base material 32. In the airbag cover 20C, a base material 32C and a retainer 50C are integrally molded by two-color molding using molding materials, fitting holes 48cb, 48db are formed in the left side portion 48c and the right side portion 48d of a peripheral edge coupling portion 48C on both the left and right sides of the door constituent portions 35 (F, B) of the base material 32C, and fitting convex portions 51a molded to be fitted into the fitting holes 48cb, 48db are formed in the peripheral edge portion 51 of the retainer 50C. In an airbag cover main body 31C of the airbag cover 20C, since the base material 32C and the retainer 50C are two-color molded such that the fitting convex portions 51a are fitted into the fitting holes 48cb, 48db, the coupling area (bond area) increases, and the coupling strength (bond strength) of the door support portions 58 (F, B) and the peripheral edge portion 51C of the retainer 50C to the base material 32C can be improved.

In the airbag cover 20 of the embodiment, the airbag cover main body 31 is integrally molded by two-color molding using the molding materials of the base material 32 and the retainer 50.

Therefore, in the embodiment, the base material 32 and the retainer 50 are separately formed, compared with the case where the airbag cover main body is formed by bonding the base material 32 and the retainer 50 by vibration welding or the like, or by insert-molding, a mold cost and man-hours are reduced, and the airbag cover main body 31 can be efficiently formed, which can contribute to the reduction of the man-hours and the cost of manufacturing the airbag cover 20. Of course, if this point is not taken into consideration, the base material 32 and the retainer 50 may be separately formed and bonded by vibration welding or the like to form the airbag cover main body, or one of the base material 32 and the retainer 50 may be molded in advance and the molded product may be insert-molded as an insert to form the airbag cover main body.

In the embodiment, the door portions of the airbag cover are configured to open to both the front and rear sides, but may be a single door portion which opens to the front side or the like. The door portions of the airbag cover may be of a four door type, in which the breakable portion has a shape in which both ends of the horizontal line portion are opened in a Y shape, and the four doors include, for example, two on both front and rear sides of the horizontal line portion, and two on both left and right sides surrounded by the Y-shaped breakable portions on both sides of the horizontal line portion.

The invention claimed is:

1. An airbag cover which includes a door portion configured to be pushed and opened by an airbag to form a protruding opening of the airbag when the airbag is inflated, the airbag cover comprising:
   a base material made of a synthetic resin and disposed in an area including the door portion;
   a retainer made of a synthetic resin softer than the base material and coupled to a back surface side of the base material in a disposition area of the door portion;
   an airbag cover main body including the base material and the retainer; and
   a flexible skin layer bonded to a front surface side of the airbag cover main body and breakable when the door portion is opened, wherein:
   the door portion includes:
      a door constituent portion of the base material; and
      a door support portion provided in the retainer and holding the door constituent portion;
   the retainer includes:
      the door support portion;
      a peripheral edge portion disposed around the door support portion; and
      a hinge portion being substantially flat plate-shaped, disposed between the peripheral edge portion, and the door support portion and bendable when the door portion is opened;
   the base material is provided with a space portion at a disposition portion of the hinge portion of the retainer, and the hinge portion is a non-disposition portion of the base material; and
   a region of the hinge portion includes two layers of the hinge portion of the retainer and the skin layer bonded to the hinge portion.

2. The airbag cover according to claim 1, wherein the door portion includes three layers of the skin layer, the door constituent portion of the base material, and the door support portion of the retainer disposed from an outer surface side.

3. The airbag cover according to claim 1, wherein:
   a breakable portion which is broken by being pushed by the inflating airbag is disposed around the door portion except for the disposition portion of the hinge portion; and
   the breakable portion includes, as a non-disposition portion of the retainer, two layers of the skin layer and the base material provided with a weak portion.

4. The airbag cover according to claim 1, wherein the retainer is configured such that the peripheral edge portion is provided with a coupling wall portion which is coupled to an attachment base of an airbag device holding the folded airbag.

5. The airbag cover according to claim 1, wherein a portion formed of the three layers of the skin layer, the base material, and the retainer is disposed in an outer area of the hinge portion in the disposition area of the door portion.

6. The airbag cover according to claim 1, wherein the airbag cover main body is integrally molded by two-color molding using molding materials of the base material and the retainer.

* * * * *